United States Patent
Kim et al.

(10) Patent No.: US 9,438,669 B2
(45) Date of Patent: Sep. 6, 2016

(54) SYSTEM AND METHOD FOR PACKETIZING DATA STREAM IN PEER-TO-PEER (P2P) BASED STREAMING SERVICE

(75) Inventors: Young Wook Kim, Seongnam-si (KR);
Jong Soo Kim, Seongnam-si (KR);
Jung Jun Park, Seongnam-si (KR);
Seung Kwan Yang, Seongnam-si (KR);
Jae Won Oh, Seongnam-si (KR);
Chang Hee Woo, Seongnam-si (KR);
Sang Hyun Lee, Seongnam-si (KR)

(73) Assignee: Naver Corporation, Gyeonggi-Do (KR)

( * ) Notice: Subject to any disclaimer, the term of this patent is extended or adjusted under 35 U.S.C. 154(b) by 491 days.

(21) Appl. No.: 13/353,491

(22) Filed: Jan. 19, 2012

(65) Prior Publication Data

US 2013/0018991 A1 Jan. 17, 2013

(30) Foreign Application Priority Data

Jan. 19, 2011 (KR) ......................... 10-2011-0005342
Jan. 20, 2011 (KR) ......................... 10-2011-0005923

(51) Int. Cl.
*G06F 15/16* (2006.01)
*H04L 29/08* (2006.01)
(Continued)

(52) U.S. Cl.
CPC ............ *H04L 67/104* (2013.01); *H04L 65/607* (2013.01); *H04N 21/236* (2013.01); *H04N 21/8456* (2013.01); *H04N 21/6377* (2013.01)

(58) Field of Classification Search
CPC .... H04L 67/104; H04L 65/607; G06F 15/16
USPC .......................................................... 709/219
See application file for complete search history.

(56) References Cited

U.S. PATENT DOCUMENTS 5,233,603 A * 8/1993 Takeuchi et al. ............. 370/412
7,710,973 B2 * 5/2010 Rumbaugh et al. .......... 370/394
(Continued)

FOREIGN PATENT DOCUMENTS

JP 08-195747 7/1996
JP 2002208953 A 7/2002
(Continued)

OTHER PUBLICATIONS

NPL4: (Title: BASS: BitTorrent Assisted Streaming System for Video-on-Demand; IEEE Publication; 2005; by Dana et al).*
(Continued)

*Primary Examiner* — Tauqir Hussain
(74) *Attorney, Agent, or Firm* — Harness, Dickey & Pierce, P.L.C.

(57) ABSTRACT

A system to packetize a data stream includes a piece generating unit including a processor configured to generate data pieces of the data stream, each data piece being generated during an equal time interval, and a communication unit to transmit the pieces of the data stream. A method that uses a processor to packetize a data stream includes generating, using the processor, data pieces of the data stream, each data piece being generated during an equal time interval, and transmitting the pieces of the data stream. A non-transitory computer-readable medium includes a program for instructing a computer, when executed by a processor, to perform the steps of: generating data pieces of the data stream, each data piece being generated during an equal time interval; and transmitting the pieces of the data stream.

18 Claims, 21 Drawing Sheets

(51) Int. Cl.
*H04N 21/236* (2011.01)
*H04N 21/845* (2011.01)
*H04L 29/06* (2006.01)
*H04N 21/6377* (2011.01)

(56) References Cited

U.S. PATENT DOCUMENTS

| | | | |
|---|---|---|---|
| 7,861,050 B2* | 12/2010 | Retnamma et al. | 711/162 |
| 8,150,675 B1 | 4/2012 | Ortmanns et al. | |
| 8,200,810 B2* | 6/2012 | Gagliardi et al. | 709/224 |
| 8,316,146 B2 | 11/2012 | Ehn et al. | |
| 8,443,086 B2* | 5/2013 | Hsu | H04L 67/104 707/622 |
| 8,806,050 B2* | 8/2014 | Chen | H04L 65/607 709/227 |
| 8,918,533 B2* | 12/2014 | Chen | H04N 21/23439 709/231 |
| 9,094,263 B2* | 7/2015 | Cohen | H04L 29/08333 |
| 9,185,439 B2* | 11/2015 | Chen | G11B 27/034 |
| 9,237,101 B2* | 1/2016 | Chen | H04L 1/004 |
| 9,246,633 B2* | 1/2016 | Luby | H03M 13/1191 |
| 9,270,299 B2* | 2/2016 | Luby | H03M 13/3761 |
| 9,288,010 B2* | 3/2016 | Luby | H04L 1/0056 |
| 2003/0002637 A1 | 1/2003 | Miyauchi et al. | |
| 2005/0097445 A1 | 5/2005 | Day et al. | |
| 2005/0226272 A1 | 10/2005 | Luby et al. | |
| 2008/0098123 A1 | 4/2008 | Huang et al. | |
| 2008/0134258 A1 | 6/2008 | Goose et al. | |
| 2008/0201424 A1 | 8/2008 | Darcie | |
| 2008/0263057 A1 | 10/2008 | Thompson | |
| 2009/0031370 A1* | 1/2009 | Riley et al. | 725/93 |
| 2009/0103563 A1* | 4/2009 | Jung et al. | 370/469 |
| 2009/0113235 A1 | 4/2009 | Selinger | |
| 2009/0113253 A1 | 4/2009 | Wang et al. | |
| 2009/0303897 A1 | 12/2009 | Kouretas et al. | |
| 2010/0083268 A1 | 4/2010 | Morris | |
| 2010/0122026 A1 | 5/2010 | Umamageswaran et al. | |
| 2010/0153578 A1* | 6/2010 | Van Gassel et al. | 709/231 |
| 2011/0072450 A1* | 3/2011 | Kokernak et al. | 725/23 |
| 2011/0106965 A1 | 5/2011 | Chun et al. | |
| 2012/0137017 A1 | 5/2012 | Kim et al. | |
| 2012/0297405 A1 | 11/2012 | Zhang et al. | |
| 2013/0024583 A1 | 1/2013 | Kim et al. | |

FOREIGN PATENT DOCUMENTS

| | | |
|---|---|---|
| JP | 2004-343417 | 12/2004 |
| JP | 2007-259000 | 10/2007 |
| JP | 2010-141567 | 6/2010 |
| KR | 10-2006-0017695 | 2/2006 |
| KR | 10-2007-0102896 | 10/2007 |
| KR | 10-2007-0103801 | 10/2007 |
| KR | 10-2008-0022857 | 3/2008 |
| WO | WO 2009076251 A2 * | 6/2009 |

OTHER PUBLICATIONS

Office Action issued on Oct. 29, 2013 by the Japanese Patent Office for corresponding Japanese Patent Application No. 2012-008396.
Non-Final Office Action issued on May 20, 2013 in U.S. Appl. No. 13/353,582.
Japanese Office Action dated Jul. 1, 2014 in corresponding Japanese Application No. 2012-008396.
Korean Office Action dated Apr. 9, 2014 in corresponding Application No. 10-2011-0005342.
Petter Sandvik, et al., "The Distance-Availability Weighted Piece Selection Method for BitTorrent", 2009 First International Conference on Advances in P2P Systems, 2009, IEEE, pp. 198-202.
Non-Final Office Action dated Feb. 17, 2015 for corresponding U.S. Appl. No. 13/353,582.
Non-Final Office Action for corresponding U.S. Appl. No. 13/353,582 dated May 5, 2015.
Korean Office Action dated Apr. 5, 2016 for Application No. KR 10-2012-0138689.
Japanese Office Action issued on May 31, 2016 by the Japanese Patent Office for corresponding JP Patent Application No. 2012-008396.
Non-Final Office Action dated Jul. 12, 2016 in corresponding U.S. Appl. No. 13/353,582.

* cited by examiner

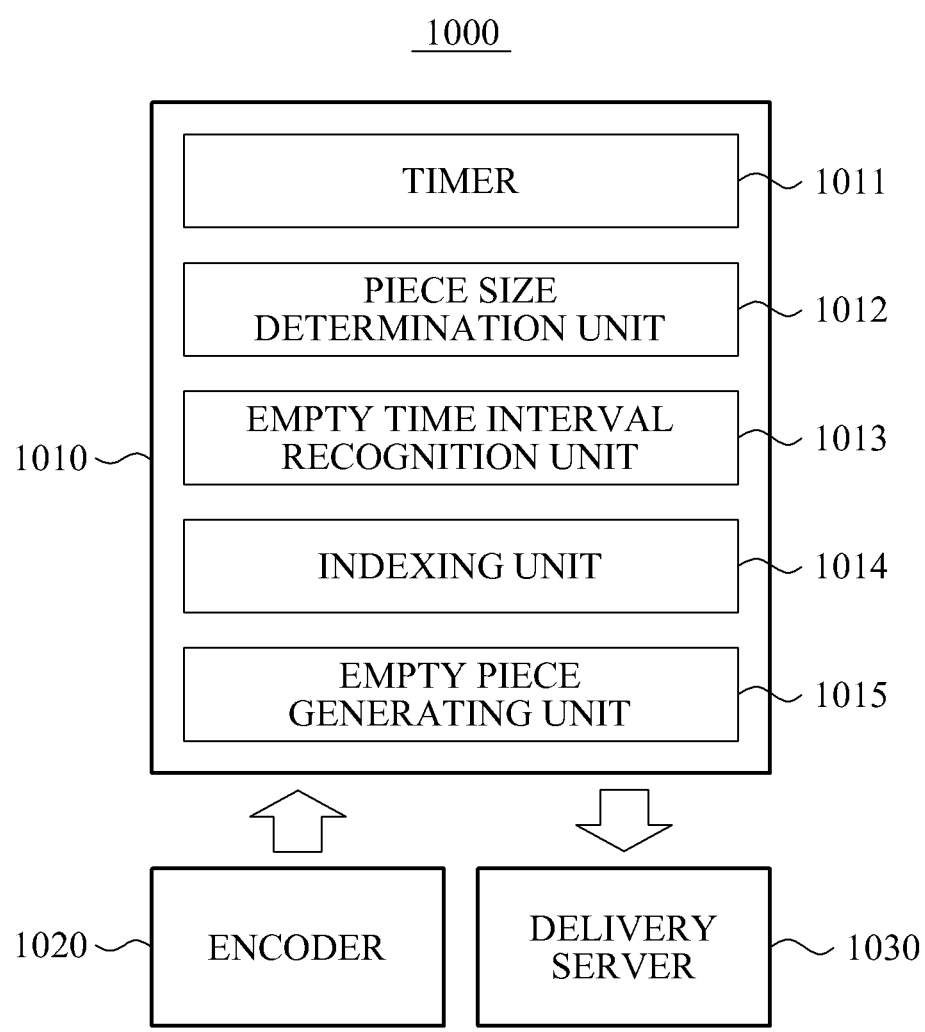

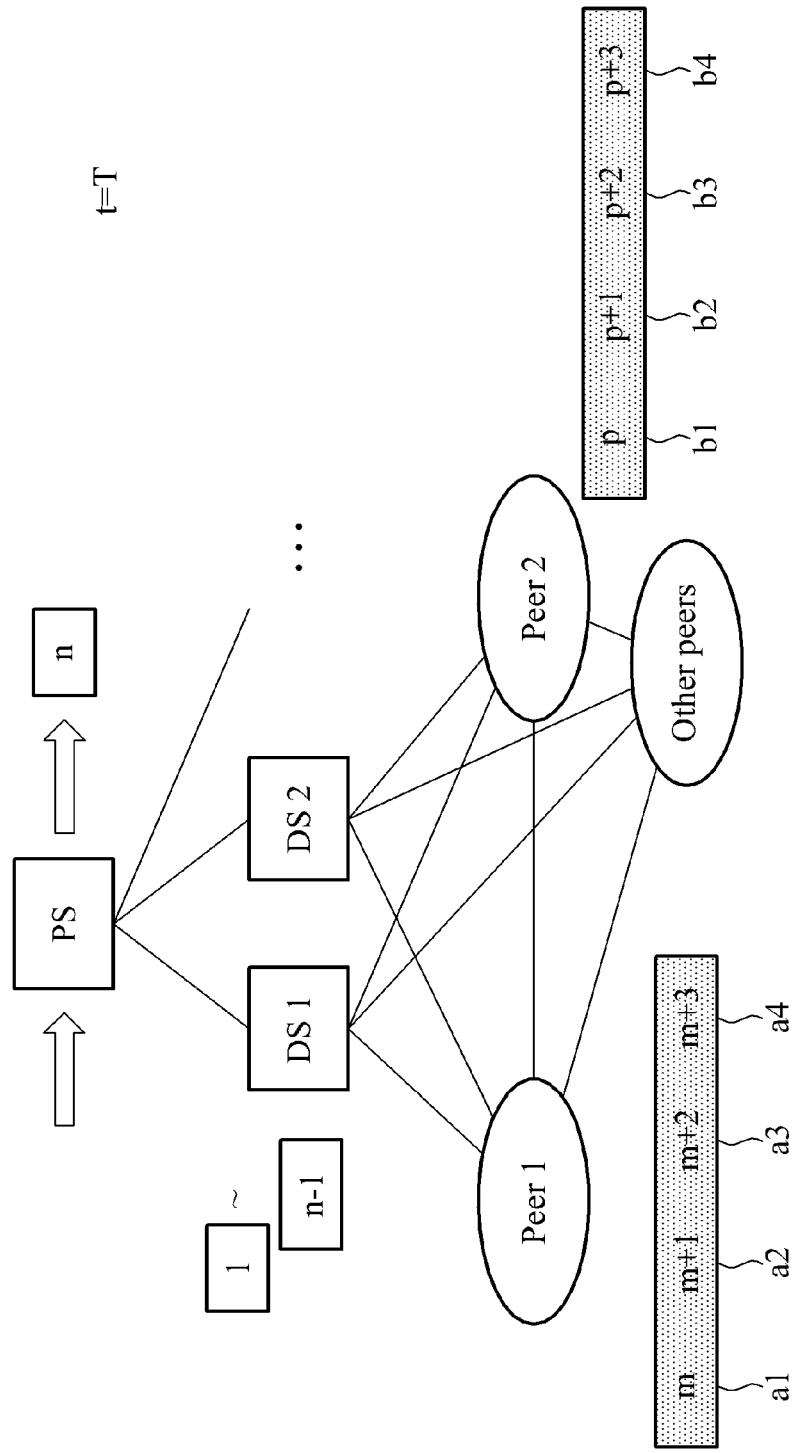

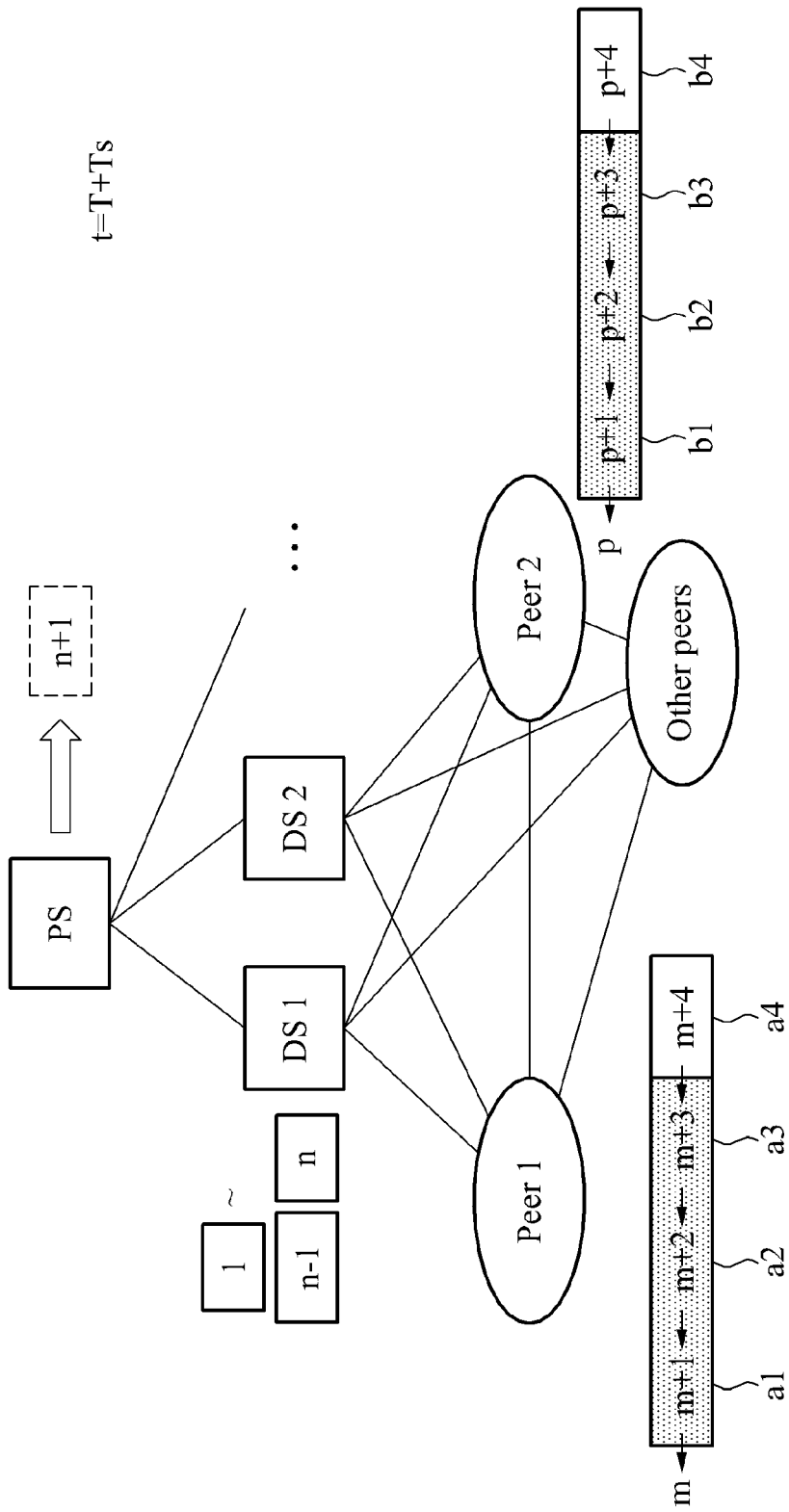

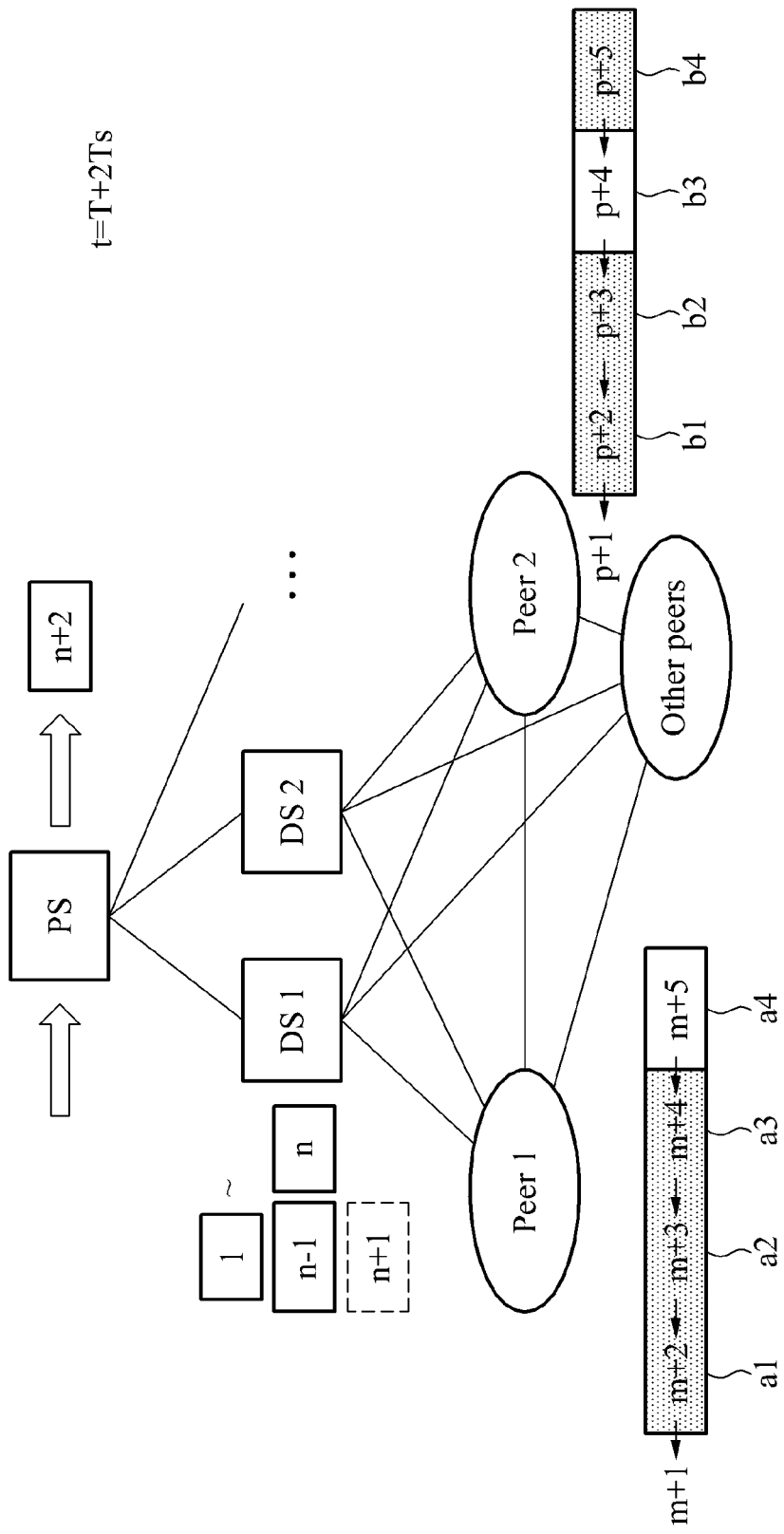

SYSTEM AND METHOD FOR PACKETIZING DATA STREAM IN PEER-TO-PEER (P2P) BASED STREAMING SERVICE

CROSS-REFERENCE TO RELATED APPLICATION

This application claims priority from and the benefit of Korean Patent Application No. 10-2011-0005342, filed on Jan. 19, 2011, and Korean Patent Application No. 10-2011-0005923, filed on Jan. 20, 2011, all of which are hereby incorporated by reference for all purposes as if fully set forth herein.

BACKGROUND OF THE INVENTION

1. Field of the Invention

Exemplary embodiments of the present invention relate to a system and method for packetizing a data stream in a peer-to-peer (P2P) based streaming service.

2. Discussion of the Background

A peer-to-peer (P2P) service refers to a service in which data or information is received directly from peer terminals such as personal computers that are connected to a network such as the Internet. The P2P service may be different from a conventional scheme of searching for information on the Internet using a search engine.

Further, 'streaming' refers to a technology for play back of a file by receiving the file in real time through a network. For example, progressive streaming is one type of streaming technologies.

When the streaming technology is applied to a P2P technology, server load or service load may be reduced, such that cost reduction for the server operation may be realized. In order to achieve the foregoing, a client using a P2P-based streaming service may incorporate a function for the P2P-based streaming service into a content player to play back a content, such as a multimedia file, and may communicate with a server providing the P2P-based streaming service, thereby embodying the P2P-based streaming service. More particularly, a server may provide a list of contents available on a web page, and the client may select a desired content in the list by clicking the desired content. When the content is selected, the content player installed in the client is executed to play back the selected content. The content player plays back the selected content by receiving the content from the server and other peers using the P2P-based streaming technology. The client and other peers may also be referred to as peer clients or peers.

If a user of the client accesses a server to use the P2P-based streaming service, and selects a content, a peer having the selected content is identified, and connected to the client in order to provide the content to the client. That is, the content player of the client plays back file pieces of the selected content by receiving the file pieces of the content from the server or other connected peers having the content.

In a P2P-based streaming service, predetermined-sized pieces of a data stream may be generated. The predetermined-sized pieces of the data stream may be stably generated according to a preset bit rate of an encoder. However, since a data stream received from an encoder may be inconsistent, an amount of time used for generating each piece may also be inconsistent in this scheme. Accordingly, a varying packetizing rate of the data stream may cause an asynchronization with a peer and thus a sharing ratio may decrease. Further, in order to preset a bit rate of the encoder in a system, the system may need to be re-started if an error occurs in the encoder or the encoder is replaced. Further, the system may not support a Variable Bit Rate (VBR) for the P2P-based streaming service.

To address aforementioned problems, a system and method for packetizing a data stream in a P2P-based streaming service will be provided.

SUMMARY OF THE INVENTION

Exemplary embodiments of the present invention provide a system and method for generating pieces of a received data stream based on a time interval.

Exemplary embodiments of the present invention also provide a system and method that may deal with inconsistent encoder traffic, operate a system stably in a varying bit rate, and support a Variable Bit Rate (VBR).

Exemplary embodiments of the present invention also provide a system and method that may maintain synchronization with a peer and may prevent a decrease in a sharing ratio, and generate an empty piece.

Additional features of the invention will be set forth in the description which follows, and in part will be apparent from the description, or may be learned by practice of the invention.

An exemplary embodiment of the present invention provides a system to packetize a data stream, including a piece generating unit including a processor configured to generate data pieces of the data stream, each data piece being generated during an equal time interval; and a communication unit to transmit the pieces of the data stream.

An exemplary embodiment of the present invention provides a method that uses a processor to packetize a data stream, including generating, using the processor, data pieces of the data stream, each data piece being generated during an equal time interval; and transmitting the pieces of the data stream.

An exemplary embodiment of the present invention provides a non-transitory computer-readable medium including a program for instructing a computer, when executed by a processor, to perform the steps of: generating data pieces of the data stream, each data piece being generated during an equal time interval; and transmitting the pieces of the data stream.

An exemplary embodiment of the present invention provides a system to packetize data pieces from a data stream in a peer-to-peer based streaming service, including a piece generating unit including a processor configured to packetize a first data piece in a first time interval, and to packetize a second data piece in a second time interval, the first time interval and the second time interval having an equal duration; and a communication unit configured to transmit the first data piece and the second data piece to a peer client. The sizes of the first data piece and the second data piece are determined based on a bit rate of an encoder for the data stream.

An exemplary embodiment of the present invention provides a method for processing a data stream in a peer-to-peer based streaming service, including receiving a piece of the data stream; storing the piece in an assigned location of a buffer; and processing the stored piece based on a processing time interval. The processing time interval is associated with a packetizing time interval of the data stream.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 10 is a block diagram illustrating a packetizing system to packetize a data stream in a peer-to-peer based streaming service according to an exemplary embodiment of the present invention.

FIG. 13A, FIG. 13B, and FIG. 13C are diagrams illustrating a synchronization of processing rates of pieces according to an exemplary embodiment of the present invention.

DETAILED DESCRIPTION OF THE ILLUSTRATED EMBODIMENTS

Figure 1:
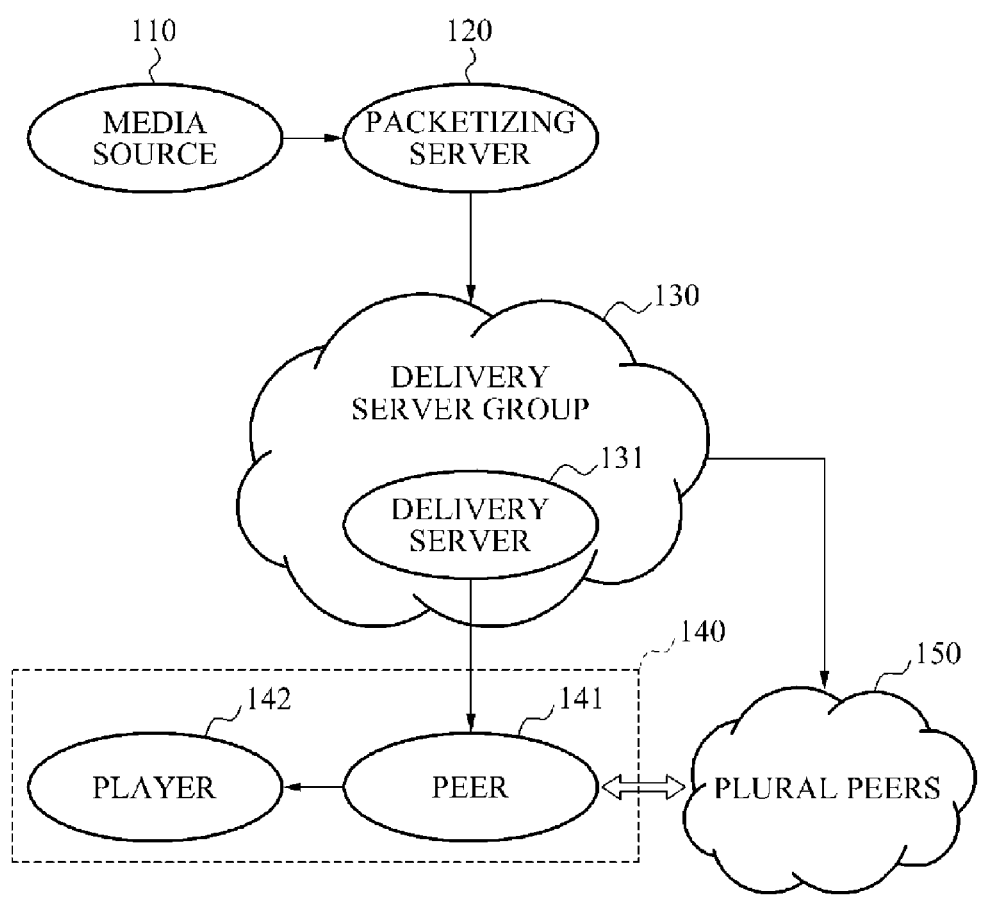
FIG. 1 is a diagram illustrating a schematic configuration of a system to provide a peer-to-peer (P2P) based streaming service according to an exemplary embodiment of the present invention.

Exemplary embodiments now will be described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure is thorough, and will fully convey the scope of the invention to those skilled in the art. Throughout the drawings and the detailed description, unless otherwise described, the same drawing reference numerals are understood to refer to the same elements, features, and structures. The relative size and depiction of these elements may be exaggerated for clarity, illustration, and convenience.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that for the purposes of this disclosure, "at least one of" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). It will be understood that when an element is referred to as being "connected to" another element, it can be directly connected to the other element, or intervening elements may be present.

FIG. 1 is a diagram illustrating a schematic configuration of a system to provide a peer-to-peer (P2P) based streaming service according to an exemplary embodiment of the present invention. As shown in FIG. 1, the system includes a media source 110, a packetizing server 120, a delivery server group 130, a client 140, and a plurality of peers 150.

The media source 110 may include an encoder to provide a data stream. The packetizing server 120 may receive the data stream from the media source 110 and may index at least one piece of the received data stream. One of various schemes that are already known may be used as a method of indexing at least one piece of a data stream in order to provide the data stream through a P2P service. The packetizing server 120 may include one or more packetizing servers corresponding to each media source 110. For example, it may be assumed that four professional baseball games are broadcasted in real time. When four media sources 110 are provided for the four games, four packetizing servers 120 may be used for the four media sources 110, respectively. Each media source 110 and/or services therefrom may be referred to as a channel. Further, corresponding streaming services and corresponding servers for each of the multiple media sources 110 may be distinguished by channel information. If one or more packetizing servers 120 correspond to each of media sources 110, a corresponding packetizing server 120 for each media source 110 may also be referred to as a channel. The packetizing server 120 will be further described later with reference to FIG. 3.

The delivery server group 130 may include at least one delivery server 131. The number of delivery servers 131 operated in the delivery server group 130 may be controlled based on the number of online visitors concurrently connected to the delivery server group 130. The delivery servers 131 operated in the delivery server group 130 may be referred to as active delivery servers. The number of online visitors may be the number of peer clients concurrently connected to the delivery server group 130. Further, the number of online visitors may be the number of peer clients concurrently connected to the delivery server group 130 for a specific content if multiple contents are delivered by the delivery server group 130. The delivery server 131 may receive, from the packetizing server 120, the indexed at least one piece of the data stream and may buffer the at least one piece of the data stream. The delivery server 131 may transmit the at least one piece of the data stream to the client 140 in accordance with a request from the client 140.

The client 140 may refer to a user terminal, for example, a personal computer (PC), a mobile terminal, and the like, and may also include a peer 141 and a player 142 as illustrated in FIG. 1. The peer 141 may receive the at least one piece of the data stream from at least one of the delivery server 131 and the plurality of peers 150, and may transmit the data stream to the player 142. For example, the peer 141 may correspond to a program installed and executable in the client 140. Each of the plurality of peers 150 may also be installed and executable in a plurality of clients, respectively.

The data stream converted into the at least one piece at the packetizing server 120 may be transmitted to at least some of all connected clients through the delivery server group 130. From a point of view of the single client 140, the at least one piece of the data stream may be received from the delivery server 131 and/or other clients, and the data stream may be transmitted to the player 142, whereby the user may receive the P2P-based streaming service.

The server usage controlling system according to an embodiment of the present invention may refer to the system described with reference to FIG. 1, or may be included in or connected to the system described with reference to FIG. 1. The server usage controlling system may adaptively control the server usage based on the number of online visitors, thereby constantly maintaining low server traffic regardless of the number of online visitors. The server usage may be controlled based on a ratio of a variable to the number of online visitors concurrently connected to a server, and the variable may be determined based on an influx rate of online visitors. For example, the server usage may be computed as expressed by Equation 1.

$$\text{Server Usage} = c/n, \quad \text{[Equation 1]}$$

where 'c' denotes a variable determined based on an influx rate of online visitors, and 'n' denotes the number of online visitors concurrently connected to a server. The number of online visitors concurrently connected to a server may be referred to as the number of online visitors occupying a server, or concurrent connections number. Further, 'c' may correspond to a variable determined by an administrator or a system through an empirical test. 'c' may be determined to be a relatively larger value when the influx rate of the online visitors is higher and may be determined to be a relatively smaller value when the influx rate is lower. Equation 1 may indicate that traffic for 'c' users may be used to cover 'n' users. For example, when 'c' corresponds to six, traffic for six users may be used to cover all 'n' users, that is, all online visitors occupying the server. Further, 'n' and 'c' may be separately calculated for each channel.

The variable 'c' may be set as a constant in consideration of influx rate of online visitors. The variable 'c' may be preset based on a prediction obtained from previous data of the influx rate of online visitors and/or the number of online visitors occupying a server, and may be determined through an empirical test. Further, as 'n' increases, the server usage of each online visitor may decrease because the server usage of each online visitor is inversely proportional to 'n'. However, total server usages for a channel may be substantially constant because the number of online visitors connected to the channel increases to 'n'.

Further, the variable 'c' may be expressed by the following equation; $c=k*f(i)$, where $f(i)$ may be a function of 'i' that increases as 'i' increases. The $f(i)$ may be a monotonically increasing function. For example, $c=k*i$. That is, the variable 'c' may be proportional to the influx rate of online visitors 'i'. Further, coefficient 'k' may be determined through the empirical test. Thus, the variable 'c' may be dynamically controlled according to the change of the influx rate of online visitors 'i'.

Although the number of online visitors occupying the server increases due to an increase in the influx rate of the online visitors, the server usage may gradually decrease since the variable 'c' may be fixed or properly controlled, whereas 'n' may increase. Accordingly, low server usage may be constantly maintained regardless of the number of the online visitors.

In order to achieve the foregoing, the server usage controlling system may include a concurrent connections number providing unit (now shown) to provide the number of online visitors concurrently connected to a server, and a server usage controlling unit (not shown) to control the server usage based on a ratio of the variable to the number of online visitors concurrently connected to the server. As noted above, the variable may be determined based on an influx rate of online visitors.

Figure 2:
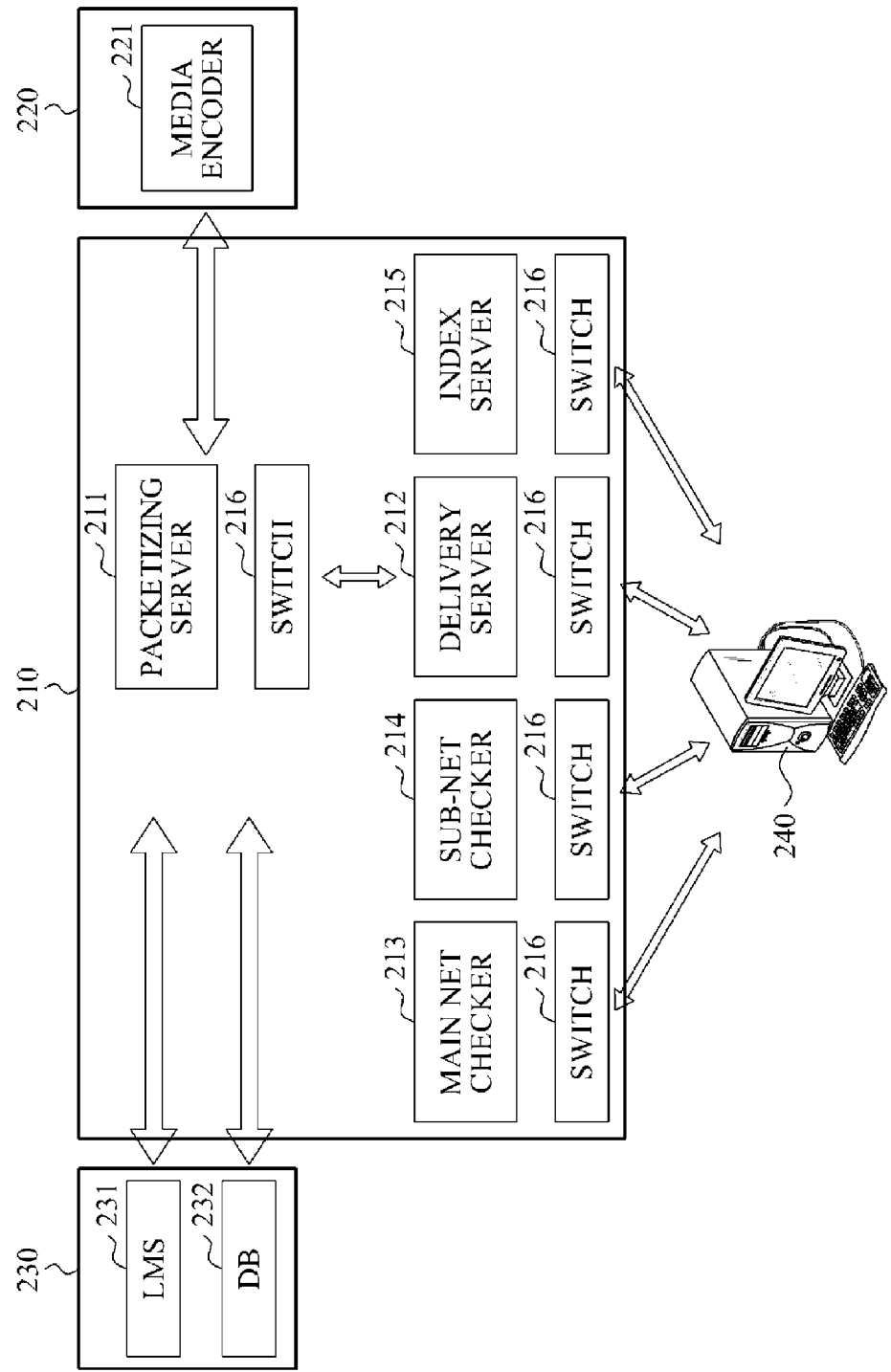
FIG. 2 is a diagram illustrating a physical configuration of a system to provide a P2P-based streaming service according to an exemplary embodiment of the present invention.

FIG. 2 is a diagram illustrating a physical configuration of a system to provide a P2P-based streaming service according to an exemplary embodiment of the present invention. FIG. 2 illustrates an external Internet data center (IDC) 210 to provide equipment for a P2P-based streaming service, an encoder apparatus 220 to provide a data stream, and an internal IDC 230 to manage a process for providing the data stream to a client 240 by the external IDC 210.

The external IDC 210 may include a packetizing server 211, a main net checker 213, a sub-net checker 214, a delivery server 212, an index server 215, and a plurality of switches 216. Each of the packetizing server 211, the delivery server 212, the main net checker 213, the sub-net checker 214, and the index server 215 may include a plurality of servers, rather than a single server. Each of the plurality of switches 216 may be used to transmit data to a corresponding server or to receive data from the corresponding server, among the plurality of servers. For example, an L4 switch may be used as each of the plurality of switches 216.

The packetizing server 211 may receive the data stream from a media encoder 221 of the encoder apparatus 220 and may process the received data stream to pieces of data to be used in the server usage controlling system. That is, the packetizing server 211 may convert the data stream into a plurality of pieces. As aforementioned, each packetizing server 211 may be operated in a corresponding media encoder 221.

Figure 3:
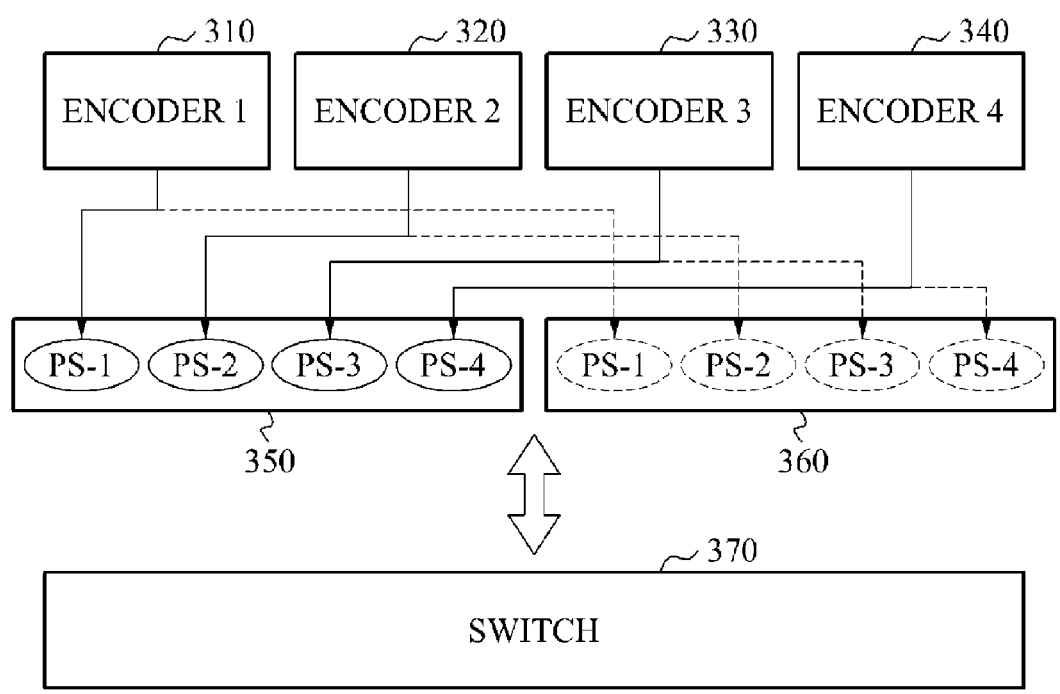
FIG. 3 is a diagram illustrating a dualization of a packetizing server according to an exemplary embodiment of the present invention.

The delivery server 212 may transfer, to the client 240, the at least one piece of the data stream received from the packetizing server 211, in accordance with a request from the client 240. Also, the index server 215 may maintain a list of clients and may provide a search service. Through the search service, a connected peer client having one or more desired pieces of the data stream may be searched for. The search service may be performed for each channel. The list of clients may also be searched for by each connected client. Further, the list of clients may be distinguished by multiple sub-lists of connected clients per content item (e.g., per channel or per media source). Referring to FIG. 3, for example, the four encoders 310, 320, 330, and 340 may provide a first content, a second content, a third content, and a fourth content, respectively. The list of clients may include a first sub-list of connected clients for the first content, a second sub-list of connected clients for the second content, a third sub-list of connected clients for the third content, and a fourth sub-list of connected clients for the fourth content. The influx rate of online visitors and the number of online visitors concurrently connected to the P2P based streaming server may be separately calculated for each content item. Further, the influx rate of online visitors and the number of online visitors concurrently connected to the P2P based streaming server may be calculated for a portion of or all the content items provided by the P2P streaming server. Further, a connected client may search for other connected peers, data stored in a buffer of other connected clients including at least one piece of a streaming data using the search service provided by the index server 215. The main net checker 213 and the sub-net checker 214 may refer to relay servers to relay connections between peers.

Table 1 shows an example of the number of servers used when the number of online visitors corresponds to 150,000, a content bit rate corresponds to 500 kilobytes per second (kbps), and a sharing ratio corresponds to 80%. The sharing ratio may be a sharing ratio of a piece of the streaming data among peer clients. Further, the sharing ratio may be calculated for each channel. The sharing ratio may be determined based on server usage in a channel and total number of pieces received by peers connected to the channel. The sharing ratio may be monitored and be used to determine the variable 'c'.

TABLE 1

| Server | Performance | Number of Servers Used |
|---|---|---|
| Index Server | Support 10,000 per an Index Server | 15 + 1 |
| Delivery Server | Support 800 Mbps per a Delivery Server | 18 + 1 |
| Packetizing Server | No Performance Issue | 2 (primary/secondary) |

A Live cast Management system (LMS) 231 included in the internal IDC 230 may refer to a peer management system. The LMS 231 may correspond to a server to manage the packetizing server 211, the delivery server 212, and the index server 215. The LMS 231 may monitor an upload and download state of a server, traffic, the number of queries, a resource, for example, a central processing unit (CPU) and a memory, a sharing ratio, and the like. Also, the LMS 231 may generate statistical data about the number of online visitors, the number of unique visitors, a sharing ratio, a user rate distribution, an average amount of viewing time, the number of channels viewed, and the like, and may store the generated statistical data in a database (DB) 232. That is, the DB 232 may refer to a server to store the statistical data. The user rate distribution may include information on the data transmission rate of each connected peer client. The average amount of viewing time may include average amount of viewing time for each media source. The number of channels viewed may include the number of media source requested by peer clients. The server usage may be stored in the index server 215, and each online visitor connected to a delivery server may use the delivery server according to the server usage stored in the index server.

The server usage controlling system may adaptively control the server usage based on the number of online visitors in real time, thereby constantly maintaining low server traffic regardless of the number of online visitors. The server usage may be controlled based on a ratio of a variable to the number of online visitors concurrently connected to a server, and the variable may be determined based on an influx rate of the online visitors. For example, the server usage may be computed as expressed by Equation 1, and the computed server usage may indicate traffic of the delivery server 212 described with reference to FIG. 2. Also, the server usage controlling system described with reference to FIG. 1 may refer to the system described with reference to FIG. 2, or may be included in the LMS 231 or the index server 215. Further, traffic usage of the delivery server 212 may be controlled by the server usage controlling system according to the influx rate of online visitors and the number of online visitors concurrently connected to a delivery server. The influx rate of online visitors and the number of online visitors concurrently connected to a delivery server may be separately calculated and applied for each channel. Further, server usage control may also be applied independently for each channel.

FIG. 3 is a diagram illustrating a dualization of a packetizing server according to an exemplary embodiment of the present invention. FIG. 3 may indicate that four packetizing servers may be operated in a main packetizing server group 350 if a data stream is provided through four encoders 310, 320, 330, and 340. That is, a PS-1, a PS-2, a PS-3, and a PS-4 may indicate the four packetizing servers.

The four packetizing servers PS-1, PS-2, PS-3, and PS-4 may convert data streams that are received from each of the four encoders 310, 320, 330, and 340, respectively into at least one data piece that may be used in P2P, and may transmit the converted data to active delivery servers. The four packetizing servers and the delivery servers may transmit and receive the data using a switch 370.

The packetizing servers may use a smaller portion of a resource, for example, a CPU, traffic, and the like. For example, when twenty delivery servers are accessed and the number of online visitors concurrently connected to a server corresponds to 150,000, less than or equal to 20 Megabits per second (Mbps)-traffic may be used for a 1-Mbps content.

Since different data streams may be transmitted from the four encoders 310, 320, 330, and 340 to each packetizing server PS-1, PS-2, PS-3, and PS-4, a piece of a data stream may be generated in either the main packetizing server group 350 or a sub-packetizing server group 360, as illustrated in FIG. 3. Accordingly, the main packetizing server group 350 and the sub-packetizing server group 360 may be operated in an active/standby form. The sub-packetizing server group 360 may be used in replacement of the main packetizing server group 350.

Figure 4:
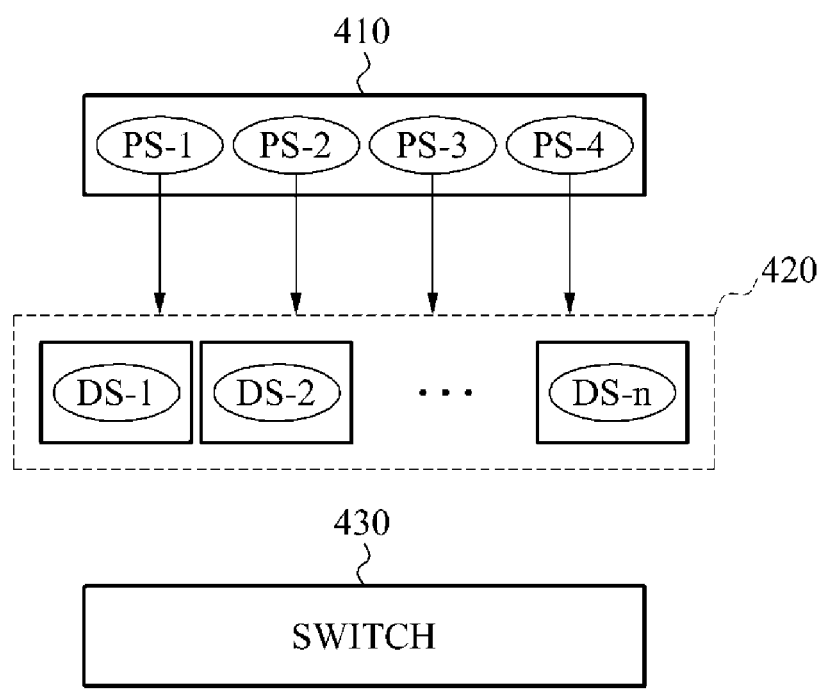
FIG. 4 is a diagram illustrating a dualization of a delivery server according to an exemplary embodiment of the present invention.

FIG. 4 is a diagram illustrating a dualization of a delivery server according to an exemplary embodiment of the present invention. Pieces corresponding to data converted by a packetizing server group 410 may be transmitted to a delivery server group 420. The 'DS-n' may refer to an 'nth' delivery server, and may indicate that 'n' delivery servers may be included in the delivery server group 420. Activated number of delivery servers may be determined based on the number of online visitors.

Each of the delivery servers may receive at least one piece of a data stream from a packetizing server, may perform buffering on a certain number of pieces, and may transmit the corresponding pieces to peers in accordance with requests from the peers corresponding to clients. Further, delivery servers included in the delivery server group 420 may be bound to a switch 430 as well, and traffic may be controlled by increasing the number of active delivery servers in accordance with an increase in the number of online visitors.

Figure 5:
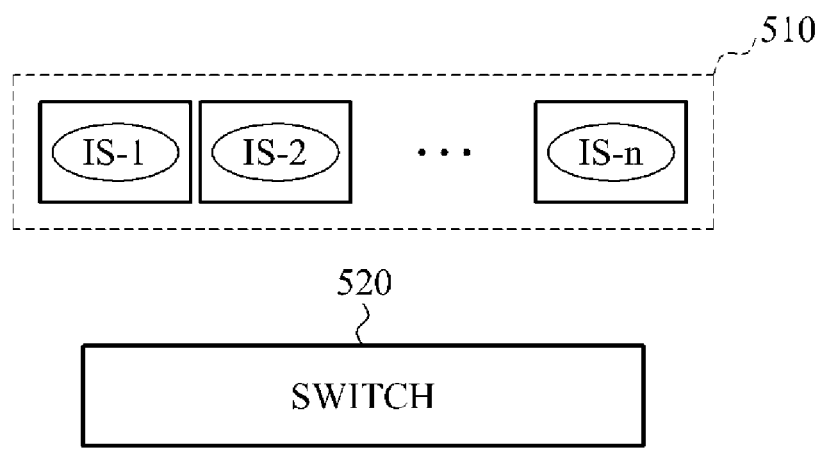
FIG. 5 is a diagram illustrating a dualization of an index server according to an exemplary embodiment of the present invention.

FIG. 5 is a diagram illustrating a dualization of an index server according to an exemplary embodiment of the present invention. An index server group 510 may include a plurality of index servers. The 'IS-n' may refer to an 'nth' index server, and may indicate that 'n' index servers may be included in the index server group 520.

Each of the plurality of index servers may manage peers corresponding to clients. More particularly, each of the plurality of index servers may manage peers installed in the clients, and may transfer a search result in response to requests from the peers. Also, the index servers may perform a message transfer, and may maintain a continuous connection with the peers. Each of the index servers may be bound to a switch 520, and the number of index servers may be increased based on the number of online visitors.

Figure 6:
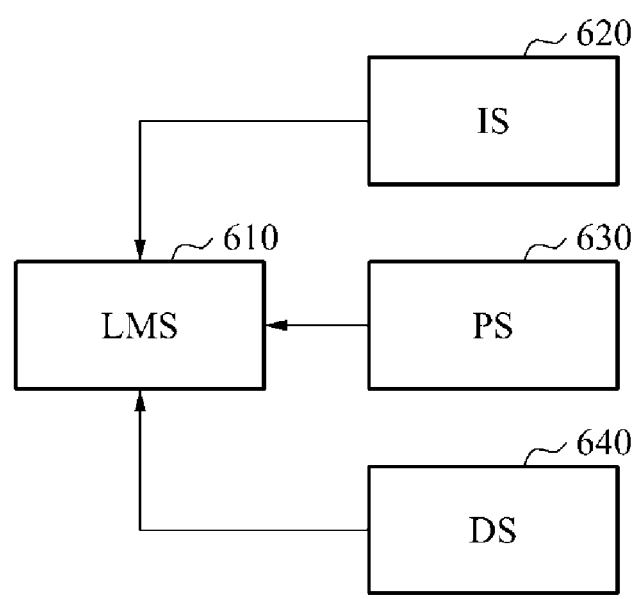
FIG. 6 is a diagram illustrating a peer management system according to an exemplary embodiment of the present invention.

FIG. 6 is a diagram illustrating a peer management system according to an exemplary embodiment of the present invention. In FIG. 6, an LMS 610 may refer to a peer management system, and an IS 620 may refer to an index server, a PS 630 may refer to a packetizing server, and a DS 640 may refer to a delivery server. The peer management system may perform management, distribution, update, and monitoring functions on the index server 620, the packetizing server 630, and the delivery server 640, and may also perform statistical data collection and analysis functions on a peer. For example, the peer management system may monitor states of the index server 620, the packetizing server 630, and the delivery server 640, for example, CPU usage, memory usage or traffic, and may provide an event alert function in response to an error or a predetermined situation through a short message service (SMS), or an e-mail.

Figure 7:
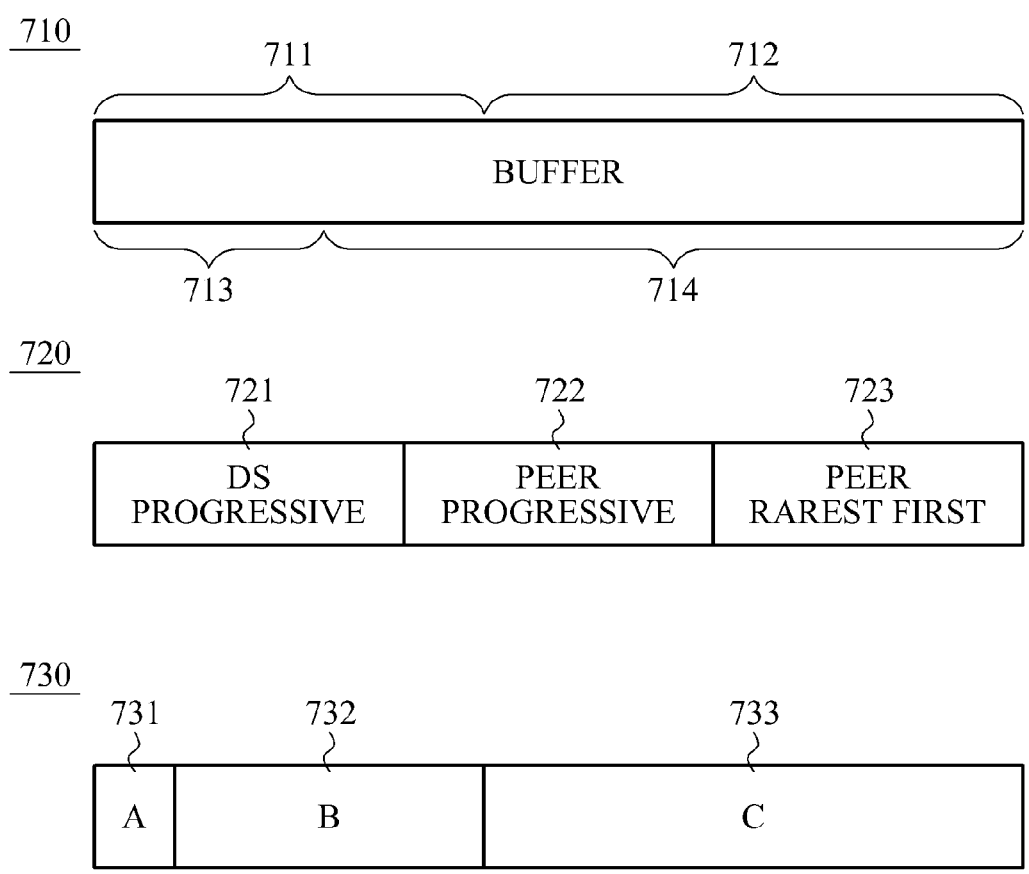
FIG. 7 is a diagram illustrating a buffer structure in a peer according to an exemplary embodiment of the present invention.

FIG. 7 is a diagram illustrating a buffer structure in a peer according to an exemplary embodiment of the present invention. A peer may correspond to software that may be installed and executed in a client, and the peer may determine which piece is to be received, and from where the corresponding piece is to be received. Table 2 shows methods of selecting a piece in a peer, and available sources.

TABLE 2

| Piece Selecting Method | Available Source |
| --- | --- |
| Rarest First | Delivery Server |
| Progressive | Other Peers |

In Table 2, 'Rarest First' may refer to a piece selecting method in which a rarest piece on a network may be received first, and 'Progressive' may refer to a piece selecting method in which pieces may be received sequentially starting from the header. The piece may be received from the delivery server, or other peers.

The peer may use a buffer to store the received pieces, for a smooth playback and a high sharing efficiency.

FIG. 7 illustrates a first buffer 710, a second buffer 720, and a third buffer 730.

The first buffer 710 may be classified into a first region 711 to store the received pieces using 'Progressive,' and a second region 712 to store the received pieces using 'Rarest First.' Further, the first buffer 710 may be classified into a third region 713 to store the pieces received from the delivery server, and a fourth region 714 to store the pieces received from other peers. Pieces stored in the first region 711 or the second region 712 may be transmitted from other peers or the delivery server, and the pieces to be stored in the first region 711 or the second region 712 may be requested to other peers before requesting to the delivery server to reduce server usage of the delivery server. Further, the first region 711 or the second region 712 may be divided into a Delivery Server (DS) region (not shown) to store the pieces received from the delivery server and a peer region (not shown) to store the pieces received from other peers.

The second buffer 720 may indicate regions of a buffer, which may be actually classified. The second buffer 720 may be classified into a first region 721 to store the pieces received from the delivery server using 'Progressive' (DS Progressive), a second region 722 to store the pieces received from the other peers using 'Progressive' (peer Progressive), and a third region 723 to store the pieces received from other peers using 'Rarest First' (peer Rarest First).

The third buffer 730 may indicate that sizes of classified regions may be different. The third buffer 730 may include a region A 731, a region B 732, and a third region C 733, each having different size. For example, the sizes of the region A 731, the region B 732, and the region C 733 may be proportioned 1:4:16, respectively. The proportions may be adaptively changed based on various parameters, such as the network condition of the peer client, the number of online visitors, and server status. Also, a portion of the pieces may be received from the server, and may be stored in the region B 732 and the region C 733. The server may be a delivery server. The first buffer 710, the second buffer 720, and the third buffer 730 may be the same buffer having different exemplary structures of buffer spaces in different perspectives. Each peer client may control at least one of the sizes of the first region 711 of the first buffer 710, the second region 712 of the first buffer 710, the third region 713 of the first buffer 710, the fourth region 714 of the first buffer 710, the first region 721 of the second buffer 720, the second region 722 of the second buffer 720, the third region 723 of the second buffer 720, the region A 731, the region B 732, and the region C 733. The size of each region may be larger than or equal to zero. Positions of multiple regions in the first buffer 710, the second buffer 720, or the third buffer 730 may be interchangeable, for example, the first region 721 may be peer progressive region to store the pieces received from other peers using 'Progressive,' and the second region 722 may be DS progressive region to store the pieces received from the delivery server using 'Progressive.'

Further, the server usage controlling system may generate buffer control information. The buffer control information may be sent to each connected peer client to control buffer allocations. The buffer control information may include information on the size of a buffer space for pieces received from the delivery server and the size of a buffer space for pieces received from other peer clients. Further, the buffer control information may include information on a ratio between the buffer space for pieces received from the delivery server and the buffer space for pieces received from other peer clients. For example, each connected peer client may control the size of the third region 713, and the fourth region 714, based on the buffer control information. Further, each connected peer client may control the size of the third region C 733, based on the buffer control information.

Details of server usage controlling system and method thereof are also found in U.S. patent application Ser. No. 13/304,337 which is hereby incorporated by reference.

According to exemplary embodiments of the present invention, a packetizing system to be described later may correspond to the packetizing server described with reference to FIG. 1, FIG. 2, FIG. 3, FIG. 4, and FIG. 6, or correspond to a system included in the packetizing server. If predetermined-sized pieces are generated, a data stream received from an encoder may be inconsistent, and an amount of time used for generating each piece may be inconsistent as well.

Figure 8A:
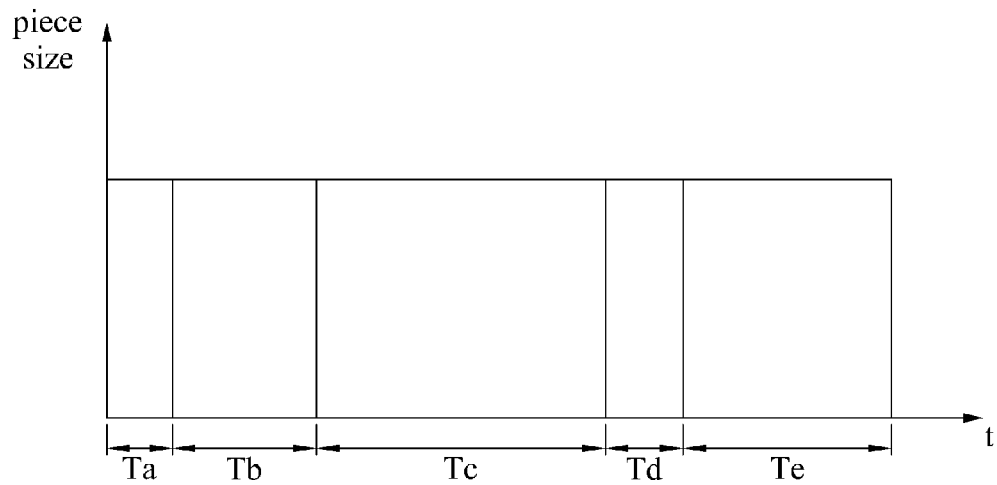
FIG. 8A is a graph illustrating a method for generating predetermined-sized pieces according to conventional art.
Figure 8B:
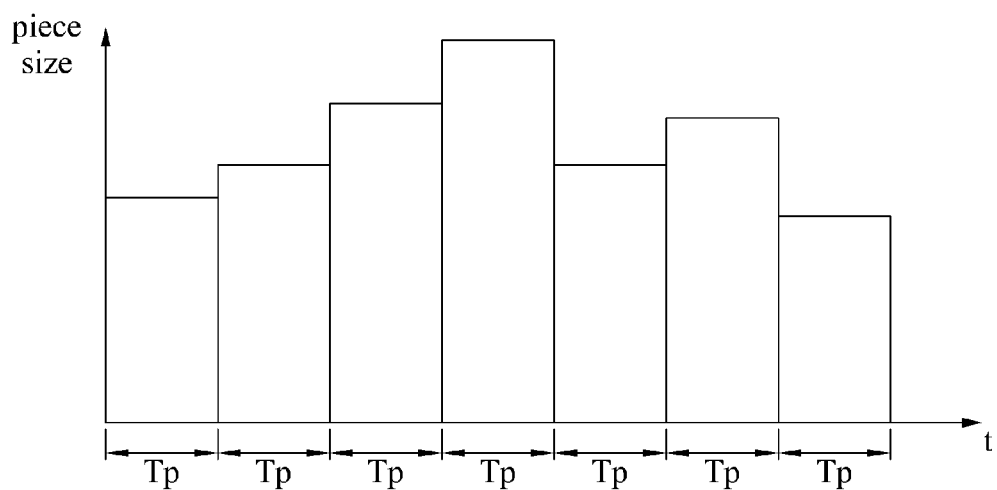
FIG. 8B is a graph illustrating a method for generating pieces based on a determined time interval according to an exemplary embodiment of the present invention.

FIG. 8A is a graph illustrating a method for generating pieces according to conventional art, and FIG. 8B is a graph illustrating a method for generating pieces based on a determined time interval according to an exemplary embodiment of the present invention. In the graph 810 of FIG. 8A and the graph 820 of FIG. 8B, the x axis denotes a flow of packetizing time, and the y axis denotes a size of generated pieces.

The graph 810 shows pieces of a streaming data having an identical size may be generated over time, however, an amount of time used for generating each of the pieces may be inconsistent due to various reasons.

The graph 820 shows that an amount of time used for generating each of pieces of streaming data may be constant by generating each of the pieces during a determined time interval 'Tp' in a packetizing system using a packetizing method based on the determined time interval. If the pieces are generated based on the determined time interval, each of the pieces may have a different size.

If pieces are generated based on the determined time interval, it may be possible to deal with inconsistent encoder traffic, operate a system providing a streaming service stably in a varying bit rate, and support a Variable Bit Rate (VBR).

Meanwhile, if packetizing is performed based on the determined time interval, a time interval during which a data stream is not received from an encoder may occur. Hereinafter, the time interval during which a data stream is not received from an encoder may be referred to as a "time interval without data stream" or an "empty time interval." During the empty time interval, pieces may not be generated. Accordingly, the packetizing rate may vary and the varying packetizing rate of the data stream may cause an asynchronization with a processing rate in a peer, and a sharing ratio may decrease.

Accordingly, the packetizing system may generate an empty piece for the empty time interval, the time interval during which a data stream is absent.

Figure 9A:
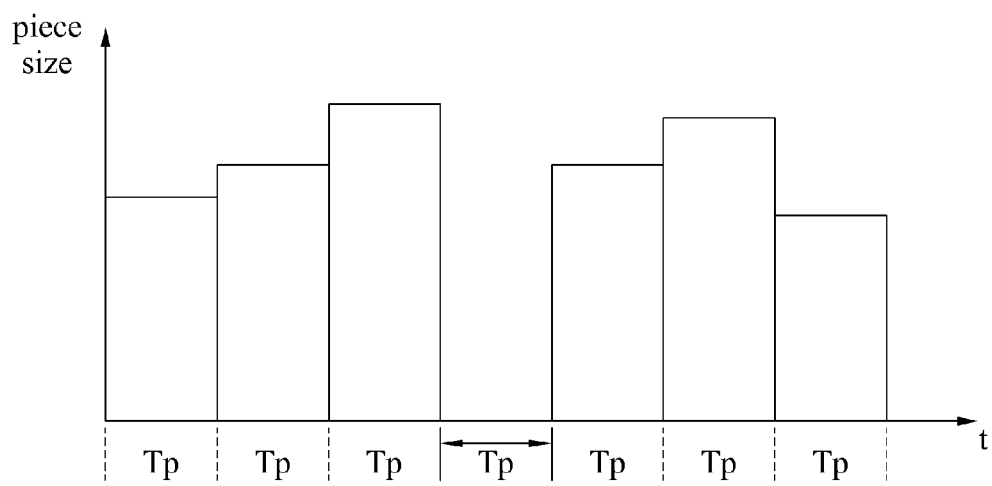
FIG. 9A is a graph illustrating a case in which a data stream for a time interval is absent according to an exemplary embodiment of the present invention.
Figure 9B:
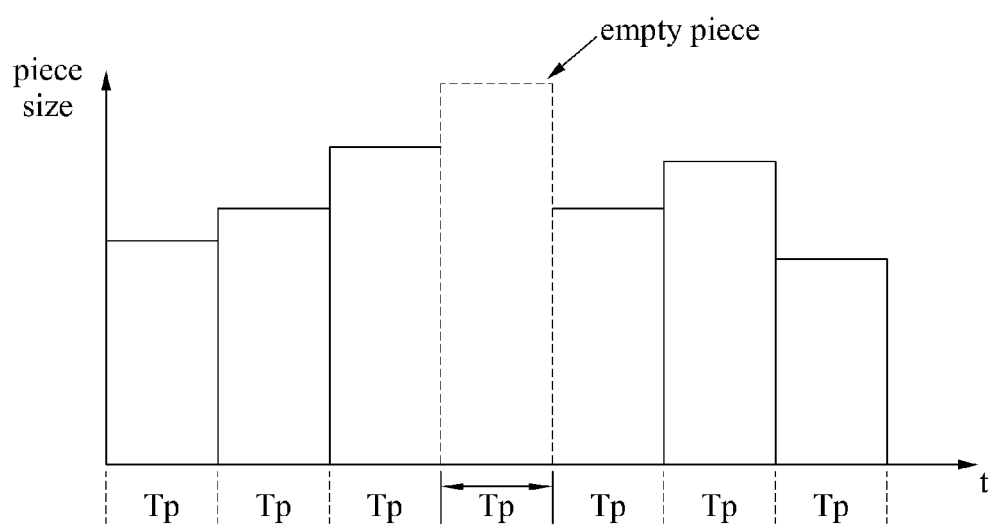
FIG. 9B is a graph illustrating a generation of an empty piece for an empty time interval according to an exemplary embodiment of the present invention.

FIG. 9A is a graph illustrating a case in which a data stream for a time interval is absent, and FIG. 9B is a graph illustrating a generation of an empty piece for an empty time interval according to an exemplary embodiment of the present invention. In the graph 910 of FIG. 9A and the graph 920 of FIG. 9B, the x axis denotes a flow of packetizing time, and the y axis denotes a size of generated pieces.

The graph 910 shows a case in which a piece may not be generated during a time interval since a data stream may not be received from an encoder during the time interval. Since a piece may not be generated during a time interval, the packetizing rate of the data stream may cause an asynchronization with a peer and thus, a sharing ratio may decrease due to the asynchronization with the peer.

The graph 920 shows an empty piece generated for an empty time interval ("dotted square"). Using the empty piece, the packetizing rate of the data stream may be synchronized with the processing rate in the peer, and the decrease in the sharing ratio may be prevented. The empty piece may include a zero padded sequence having a determined number of zeros.

FIG. 10 is a block diagram illustrating a packetizing system to packetize a data stream in a peer-to-peer based streaming service according to an exemplary embodiment of the present invention. As shown in FIG. 10, the packetizing system 1000 may include a piece generating unit 1010.

The piece generating unit 1010 may index pieces of a data stream received from an encoder 1020. The piece generating unit 1010 may generate the pieces of the received data stream based on a time interval. For example, one piece from the received data stream may be generated during one time interval thus, an amount of time for generating a piece of the received data stream may be constant. The packetizing interval 'Tp' for data stream may be associated with a processing interval 'Ts' of a peer. The packetizing interval 'Tp' may be maintained by generating each of the pieces of the data stream during a corresponding time interval Tp. The pieces of the data stream may have different sizes.

The piece generating unit 1010 may generate an empty piece for an empty time interval, a time interval during which a data stream is not received from the encoder 1020.

The generated pieces of the data stream may be transmitted to a client through a delivery server 1030 in response to a request for transmitting the pieces of the data stream from the client. A server usage may be controlled based on a ratio of the variable to the number of online visitors concurrently connected to a server, and the variable may be determined based on an influx rate of online visitors. The variable may be determined to be a relatively larger value when the influx rate of the online visitors is higher, and may be determined to be a relatively smaller value when the influx rate is lower. The controlling of the server usage has been described above in detail and thus, further description will be omitted for conciseness.

The packetizing system 1000 of FIG. 10 may correspond to the system included in the packetizing server shown in FIG. 1, FIG. 2, FIG. 3, FIG. 4, or FIG. 6. The packetizing system 1000 may include a receiving unit (not shown) to receive a data stream from the encoder 1020, and a transmitting unit (not shown) to transmit the generated pieces of the data stream to the delivery server 1030. Further, the packetizing system 1000 may include a timer 1011 to calculate a time interval, a piece size determination unit 1012 to determine the size of each piece of the data stream and to store the size information of each piece, an empty time interval recognition unit 1013 to recognize an empty time interval, an indexing unit 1014 to index the pieces of the data stream into indexed pieces, and an empty piece generating unit 1015 to generate an empty piece for the empty time interval. Further, pieces of the data stream may include index information and data stream size information. For example, index information and data stream size information may be included in the header of each piece, and a portion of data stream received during a time interval Tp may be included in the payload of each piece. The index information may include sequence information of the piece, for example, index number of the piece. The data stream size information may include size information of a portion of data stream received during the corresponding time interval Tp. The size information of the portion of data stream may be determined according to the bit rate of an encoder for encoding the data stream. For example, data stream size information of an empty piece may be zero. Further, empty pieces may not be used for play back in peer clients.

Figure 11:
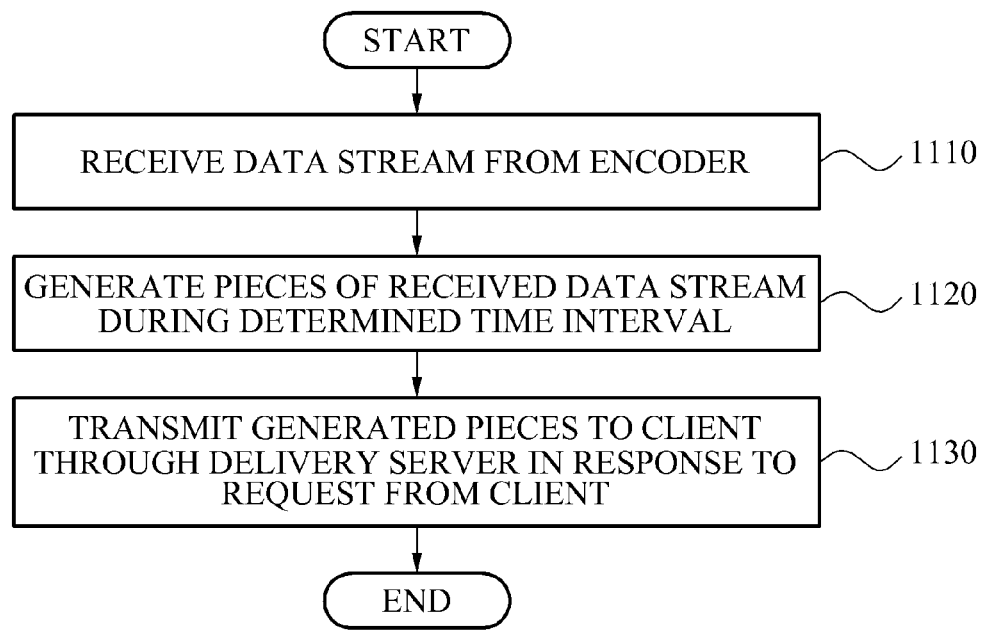
FIG. 11 is a flowchart illustrating a method for packetizing a data stream in a peer-to-peer based streaming service according to an exemplary embodiment of the present invention.

FIG. 11 is a flowchart illustrating a method for packetizing a data stream in a peer-to-peer based streaming service according to an exemplary embodiment of the present invention. FIG. 11 will be described as if performed by packetizing system 1000 shown in FIG. 10, but is not limited as such.

In operation 1110, the packetizing system 1000 may receive a data stream from an encoder. The data stream received from the encoder may be inconsistent with respect to each of determined time intervals.

Pieces may be generated during a determined time interval in operation 1120. The size of each piece may vary.

Thus, inconsistent encoder traffic may not decrease a sharing ratio among peers, and a VBR may be supported by the packetizing system 1000.

The packetizing system 1000 may generate an empty piece for a time interval during which a data stream is not received from the encoder. The empty piece may be used to maintain a higher sharing ratio among peers.

In operation 1130, the packetizing system 1000 may transmit the generated pieces to a client through a delivery server in response to a request from the client. The server usage of the delivery server may be controlled based on a ratio of the variable to the number of online visitors concurrently connected to a server, and the variable may be determined based on an influx rate of online visitors. The variable may be determined to be a relatively larger value when the influx rate of the online visitors is higher, and may be determined to be a relatively smaller value when the influx rate is lower. The controlling of the server usage has already been described above in detail and thus, further description will be omitted for conciseness.

Figure 12:
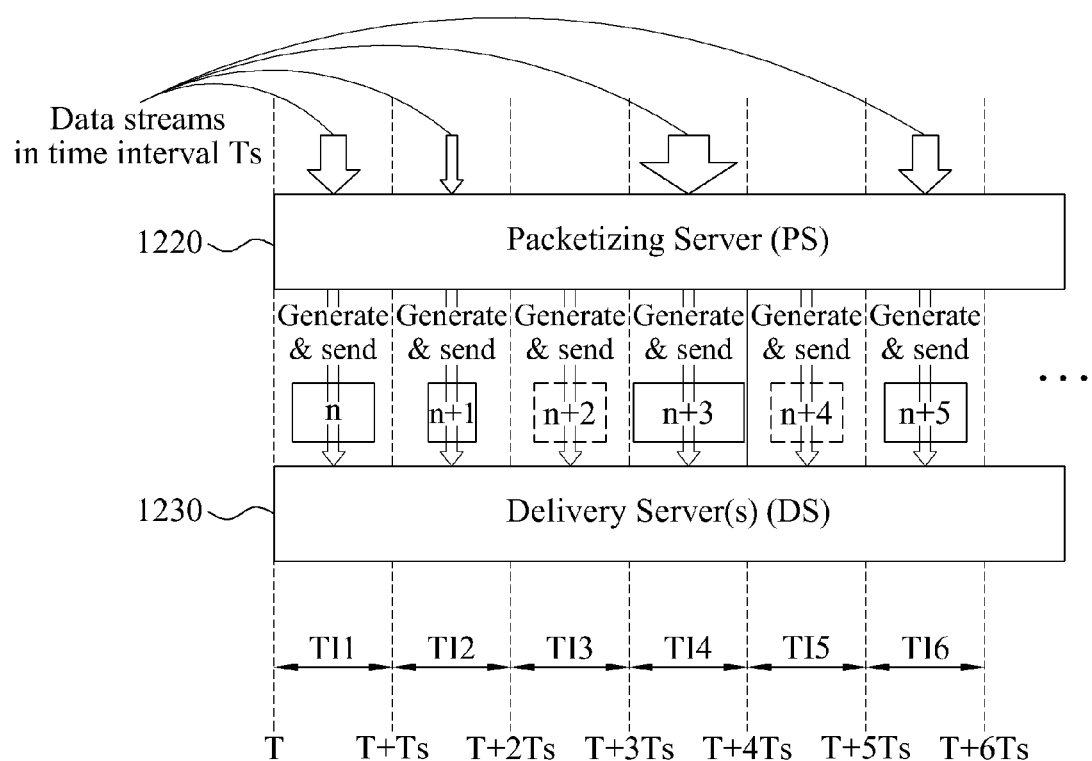
FIG. 12 is a diagram illustrating a method for packetizing a data stream based on a determined time interval according to an exemplary embodiment of the present invention.

FIG. 12 is a diagram illustrating a method for packetizing a data stream based on a determined time interval according to an exemplary embodiment of the present invention. As shown in FIG. 12, a packetizing server 1220 receives a data stream from an encoder (not shown). The packetizing server 1220 may receive a portion of the data stream during time intervals TI1, TI2, TI4, and TI6. The packetizing server 1220 receives more data stream from the encoder during the time interval TI4 than during the time intervals TI1 and TI6, and the packetizing server 1220 receives less data stream from the encoder during the time interval TI2 than during the time intervals TI1 and TI6. The pieces 'n', 'n+1', 'n+3', and 'n+5' are packetized during the time intervals TI1, TI2, TI4, and TI6, respectively. The sizes of the pieces 'n', 'n+1', 'n+3', and 'n+5' may be determined based on the amount of the received data stream during the corresponding time interval, and the amount of the received data stream may be changed based on various conditions, such as the bit rate of the encoder and the like. The packetizing server 1220 may generate empty pieces 'n+2' and 'n+4' during time intervals TI3 and TI5, respectively, if the packetizing server 1220 does not receive a data stream from the encoder during the time intervals TI3 and TI5. Thus, the packetizing server 1220 may maintain a constant piece generating rate '1/Ts' (generating one piece per a time interval Ts). The piece generating rate (=1/Ts) may be controlled by changing the size of each time interval Ts. One or more delivery server 1230 may receive pieces 'n', 'n+1', 'n+2', 'n+3', 'n+4', and 'n+5' from the packetizing server 1220 and transmit the pieces to one or more peer clients connected to receive the data stream. The time interval Ts used for generating each packet in the packetizing server 1220 may correspond to a time interval for processing a buffer in each peer to increase synchronization with a peer, but is not limited as such. For example, the time interval Ts used for generating each packet in the packetizing server 1220 may be smaller than the time interval for processing the buffer in each peer.

FIG. 13A, FIG. 13B, and FIG. 13C are diagrams illustrating a synchronization of processing rates of pieces according to an exemplary embodiment of the present invention. As shown in FIG. 13A, during a time interval Ts (from 'T' to 'T+Ts'), a packetizing server PS may generate a piece 'n' and transmit the piece 'n' to one or more delivery servers DS1 and DS2. Peer 1 and peer 2 may receive one or more pieces from delivery servers including the delivery servers DS1 and DS2 or from other connected peers. During the time interval 'Ts' from time 'T' to time 'T+Ts', peer 1 may assign pieces 'm', 'm+1', 'm+2', and 'm+3' to be stored in a first buffer space a1 of peer 1, a second buffer space a2 of peer 1, a third buffer space a3 of peer 1, and a fourth buffer space a4 of peer 1, respectively, and peer 2 may assign pieces 'p', 'p+1', 'p+2', and 'p+3' to be stored in a first buffer space b1 of peer 2, a second buffer space b2 of peer 2, a third buffer space b3 of peer 2, and a fourth buffer space b4 of peer 2, respectively. Index numbers of pieces 'n', 'm', and 'p' may be positive integers and 'n' may be larger than 'm' or 'p'. If peer 1 and peer 2 are more synchronized in processing streaming data, the difference between the index number 'm' and the index number 'p' may be smaller. For example, if n=10 and m=p=2, the packetizing server PS generates piece 10, peer 1 assigns piece 2, piece 3, piece 4, and piece 5 to be stored in the first buffer space a1, the second buffer space a2, the third buffer space a3, and the fourth buffer space a4 of peer 1, respectively, and peer 2 assigns piece 2, piece 3, piece 4, and piece 5 to be stored in the first buffer space b1, the second buffer space b2, the third buffer space b3, and the fourth buffer space b4 of peer 2, respectively, during the time interval Ts. Shaded squares for the first buffer space a1, the second buffer space a2, the third buffer space a3, and the fourth buffer space a4 of peer 1, and shaded squares for the first buffer space b1, the second buffer space b2, the third buffer space b3, and the fourth buffer space b4 of peer 2 indicate that corresponding pieces are stored in the buffer spaces. As shown in FIG. 13A, pieces 'm', 'm+1', 'm+2', and 'm+3' are stored in corresponding buffer spaces of peer 1, and pieces 'p', 'p+1', 'p+2', and 'p+3' are stored in corresponding buffer spaces of peer 2.

As shown in FIG. 13B, during a time interval Ts (from 'T+Ts' to 'T+2Ts'), the packetizing server PS may generate an empty piece 'n+1' and transmit the empty piece 'n+1' to one or more delivery servers DS1 and DS2, since the packetizing server PS does not receive data stream during the time interval Ts (from 'T+Ts' to 'T+2Ts'). Peer 1 and peer 2 may receive one or more pieces from delivery servers including the delivery servers DS1 and DS2 or from other connected peers. During the time interval 'Ts' (from time 'T+Ts' to time 'T+2Ts'), peer 1 may assign pieces 'm+1', 'm+2', 'm+3', and 'm+4' to be stored in a first buffer space a1 of peer 1, a second buffer space a2 of peer 1, a third buffer space a3 of peer 1, and a fourth buffer space a4 of peer 1, respectively, and peer 2 may assign pieces 'p+1', 'p+2', 'p+3', and 'p+4' to be stored in a first buffer space b1 of peer 2, a second buffer space b2 of peer 2, a third buffer space b3 of peer 2, and a fourth buffer space b4 of peer 2, respectively. Further, peer 1 and peer 2 shift pieces to the left during the time interval 'Ts' (from 'T+Ts' to 'T+2Ts'). For example, if n=10 and m=p=2, the packetizing server PS generates piece 11, peer 1 assigns piece 3, piece 4, piece 5, and piece 6 to be stored in the first buffer space a1, the second buffer space a2, the third buffer space a3, and the fourth buffer space a4 of peer 1, respectively, and peer 2 assigns piece 3, piece 4, piece 5, and piece 6 to be stored in the first buffer space b1, the second buffer space b2, the third buffer space b3, and the fourth buffer space b4 of peer 2, respectively, during the time interval Ts. Vacant squares for the fourth buffer space a4 of peer 1 and the fourth buffer space b4 of peer 2 indicate that corresponding pieces are not stored in the buffer spaces. As shown in FIG. 13B, pieces 'm+1', 'm+2', and 'm+3' are shifted to corresponding buffer spaces of peer 1, and pieces 'p+1', 'p+2', and 'p+3' are shifted to corresponding buffer spaces of peer 2. Piece 'm+4' and piece 'p+4' are not received during the time interval Ts (from 'T+Ts' to 'T+2Ts'), and thus the fourth buffer space a4 of peer 1 and the fourth buffer space b4 of peer 2 are vacant. Further, piece 'm' and piece 'p' are outputted from the buffer of peer 1 and the buffer of peer 2, respectively.

As shown in FIG. 13C, during a time interval Ts (from 'T+2Ts' to 'T+3Ts'), the packetizing server PS may generate a piece 'n+2' and transmit the piece 'n+2' to one or more delivery servers DS1 and DS2. Peer 1 and peer 2 may receive one or more pieces from delivery servers including the delivery servers DS1 and DS2 or from other connected peers. During the time interval 'Ts' (from time 'T+2Ts' to time 'T+3Ts'), peer 1 may assign pieces 'm+2', 'm+3', 'm+4', and 'm+5' to be stored in a first buffer space a1 of peer 1, a second buffer space a2 of peer 1, a third buffer space a3 of peer 1, and a fourth buffer space a4 of peer 1, respectively, and peer 2 may assign pieces 'p+2', 'p+3', 'p+4', and 'p+5' to be stored in a first buffer space b1 of peer 2, a second buffer space b2 of peer 2, a third buffer space b3 of peer 2, and a fourth buffer space b4 of peer 2, respectively. Further, peer 1 and peer 2 shift pieces to the left during the time interval 'Ts' (from 'T+2Ts' to 'T+3Ts'). For example, if n=10 and m=p=2, the packetizing server PS generates piece 12, peer 1 assigns piece 4, piece 5, piece 6, and piece 7 to be stored in the first buffer space a1, the second buffer space a2, the third buffer space a3, and the fourth buffer space a4 of peer 1, respectively, and peer 2 assigns piece 4, piece 5, piece 6, and piece 7 to be stored in the first buffer space b1, the second buffer space b2, the third buffer space b3, and the fourth buffer space b4 of peer 2, respectively, during the time interval Ts. Vacant squares for the fourth buffer space a4 of peer 1 and the third buffer space b3 of peer 2 indicate that corresponding pieces are not stored in the buffer spaces. As shown in FIG. 13C, pieces 'm+2' and 'm+3' are shifted to corresponding buffer spaces of peer 1, and pieces 'p+2' and 'p+3' are shifted to corresponding buffer spaces of peer 2. Piece 'm+4' and piece 'p+5' are received and stored in corresponding buffer spaces during the time interval Ts (from 'T+2Ts' to 'T+3Ts'). Piece 'm+5' and piece 'p+4' are not received during the time interval Ts (from 'T+2Ts' to 'T+3Ts'), and thus the fourth buffer space a4 of peer 1 and the third buffer space b3 of peer 2 are vacant. Further, piece 'm+1' and piece 'p+1' are outputted from the buffer of peer 1 and the buffer of peer 2, respectively.

Figure 14A:
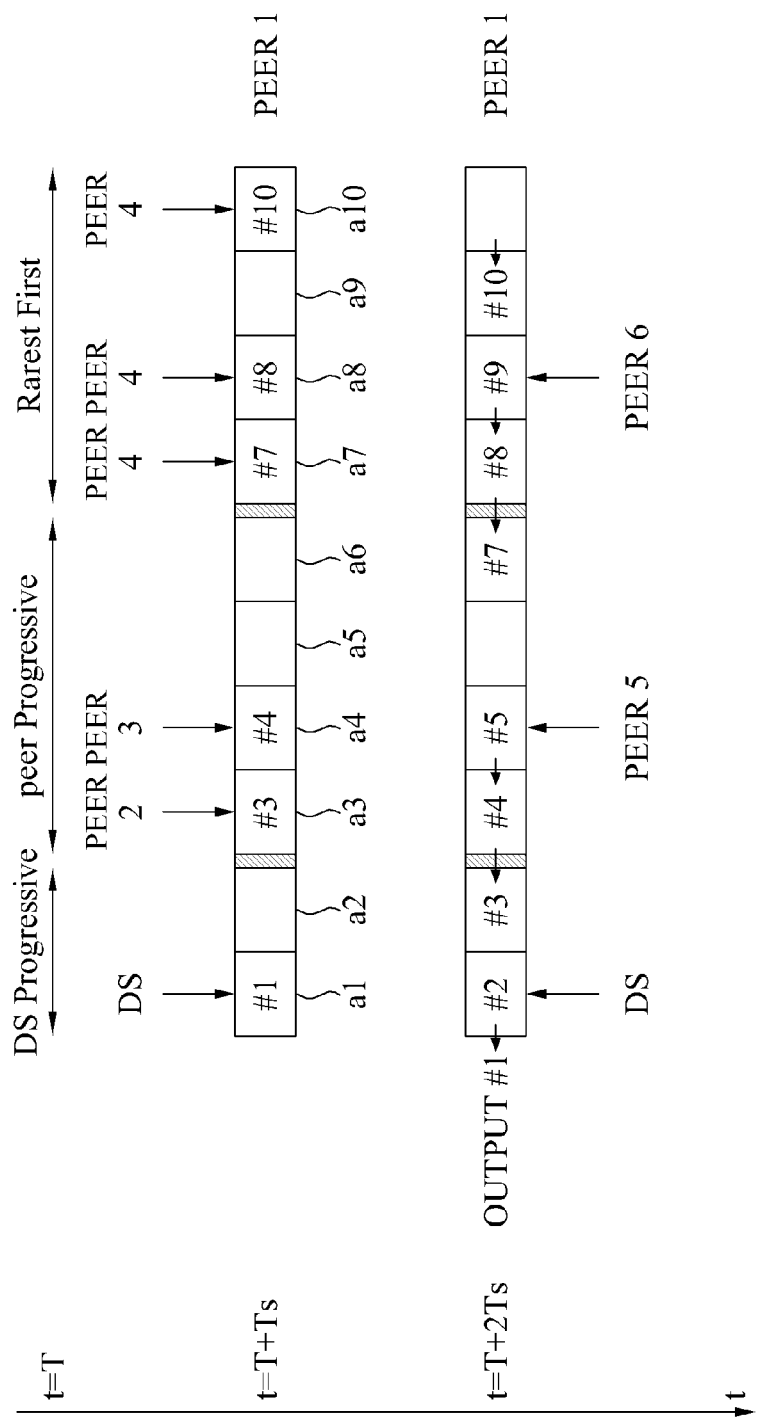
FIG. 14A is a diagram illustrating a buffer structure of a peer client according to an exemplary embodiment of the present invention.

FIG. 14A is a diagram illustrating a buffer structure of a peer client according to an exemplary embodiment of the present invention. As shown in FIG. 14A, the buffer of peer 1 may be divided into three regions, a first region (size '2'), a second region (size '4'), and a third region (size '4'). The sizes of each region may be changed, and the buffer may be divided into two regions or four or more regions. Each region may receive assigned pieces using a determined receiving scheme from a determined source during a given time interval Ts. For example, as shown in FIG. 14A, the first region may include a first buffer space a1 and a second buffer space a2. The second region may include a third buffer space a3, a fourth buffer space a4, a fifth buffer space a5, a sixth buffer space a6, and the third region may include a seventh buffer space a7, an eighth buffer space a8, a ninth buffer space a9, a tenth buffer space a10. Peer 1 may receive corresponding pieces in parallel and store the received pieces to corresponding buffer spaces. For example, peer 1 may receive piece 1 from a delivery server DS and receive piece 3, piece 4, piece 7, piece 8, piece 10 from other peers 2, 3, and 4 during a time interval Ts (from 'T' to 'T+Ts'). If a certain number of pieces are stored in the buffer, peer 1 may start to shift pieces to the left during a time interval Ts. For example, peer 1 may output piece 1 from the first buffer space a1 and shift pieces 3, 4, 7, 8, and 10 to the left during a time interval Ts (from 'T+Ts' to 'T+2Ts'). Further, peer 1 may receive piece 2 from the delivery server DS, piece 5 from peer 5, and piece 9 from peer 6 in parallel during the time interval Ts (from 'T+Ts' to 'T+2Ts'). For example, the first region, the second region, and the third region may receive pieces using 'DS Progressive', 'peer Progressive', and 'peer Rarest First', respectively. During the time interval Ts (from 'T' to 'T+Ts'), peer 1 may receive piece 3 from peer 2 and then receive piece 4 from peer 3 since the second region uses peer Progressive scheme. Further, during the time interval Ts (from 'T' to 'T+Ts'), peer 1 may receive pieces 7, 8, and 10 from peer 4 regardless of the sequence of the piece number since the third region uses peer Rarest First scheme. In the Rarest First scheme, rarer pieces may be received before receiving more common pieces. The shifting of the buffer may be performed by various queuing methods other than the method described above.

Figure 14B:
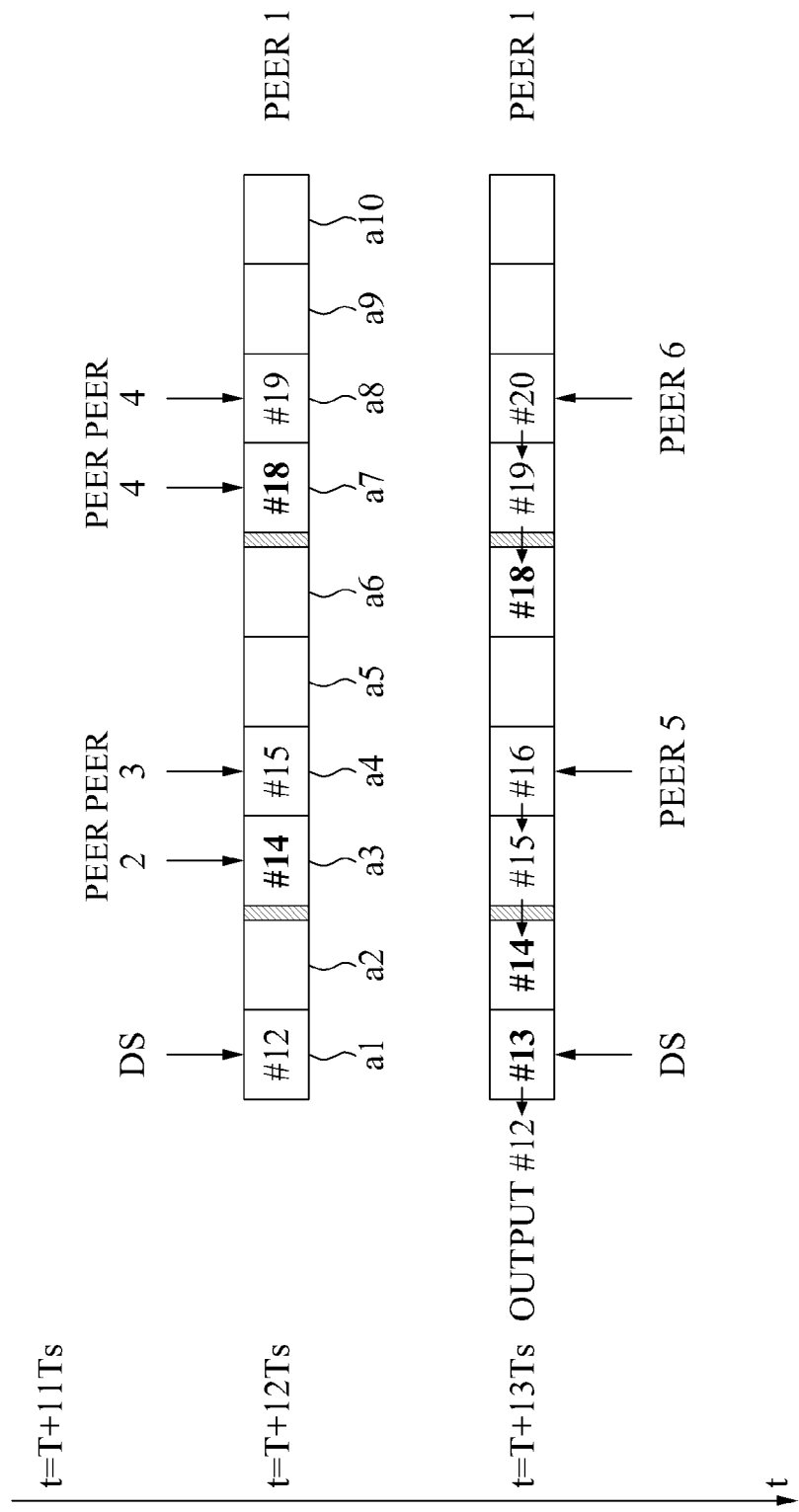
FIG. 14B is a diagram illustrating a buffer structure of a peer client according to an exemplary embodiment of the present invention.

FIG. 14B is a diagram illustrating a buffer structure of a peer client according to an exemplary embodiment of the present invention. As shown in FIG. 14B, peer 1 may receive corresponding pieces in parallel and store the received pieces to corresponding buffer spaces. For example, peer 1 may receive piece 12 from a delivery server DS and receive piece 14, piece 15, piece 18, and piece 19 from other peers 2, 3, and 4 during a time interval Ts (from 'T+11Ts' to 'T+12Ts'). Further, peer 1 may shift pieces to the left during a time interval Ts (from 'T+12Ts' to 'T+13Ts'). For example, peer 1 may output piece 12 from the first buffer space a1 and shift pieces 14, 15, 18, and 19 to the left during the time interval Ts (from 'T+12Ts' to 'T+13Ts'). Further, peer 1 may receive piece 13 from the delivery server DS, piece 16 from peer 5, and piece 20 from peer 6 in parallel during the time interval Ts (from 'T+12Ts' to 'T+13Ts'). Further, the piece receiving scheme used by the third region may have a higher priority than the piece receiving scheme used by the second region, and the piece receiving scheme used by the second region may have a higher priority than the piece receiving scheme used by the first region. If it is assumed that the first region, the second region, and the third region may receive pieces using 'DS Progressive', 'peer Progressive', and 'peer Rarest First', respectively, pieces may be requested to peers using the Rarest First scheme during the pieces are assigned in the third region. If pieces are not received during the pieces are assigned in the third region, the pieces are assigned to the second region by shifting the buffer and the pieces may be requested to peers using the Progressive scheme during the pieces are assigned in the second region. If pieces are not still received during the pieces are assigned in the second region, the pieces are assigned to the first region by shifting the buffer and the pieces may be requested to the delivery server using the Progressive scheme during the pieces are assigned in the first region. For example, as shown in FIG. 14B, pieces 18 and 19 are successfully received during the pieces 18 and 19 are assigned in the third region. Thus, pieces 18 and 19 are shifted into the second region and are not requested by the receiving schemes of the second region and the first region. Further, pieces 14 and 15 are not successfully received during the pieces 14 and 15 are assigned in the third region. Thus, pieces 14 and 15 are assigned in the second region by shifting the buffer to the left and are requested by the receiving scheme of the second region. FIG. 14B shows that pieces 14 and 15 are received from peer 2 and 3, respectively using the receiving scheme of the second region (peer Progressive, for example). Further, piece 13 is not successfully received during the piece 13 is assigned in the third region and the second region. Thus, piece 13 is assigned in the first region by shifting the buffer to the left and is requested by the receiving scheme of the first region. FIG. 14B shows that piece 13 is received from the delivery server using the receiving scheme of the first region (DS Progressive, for example).

Figure 15:
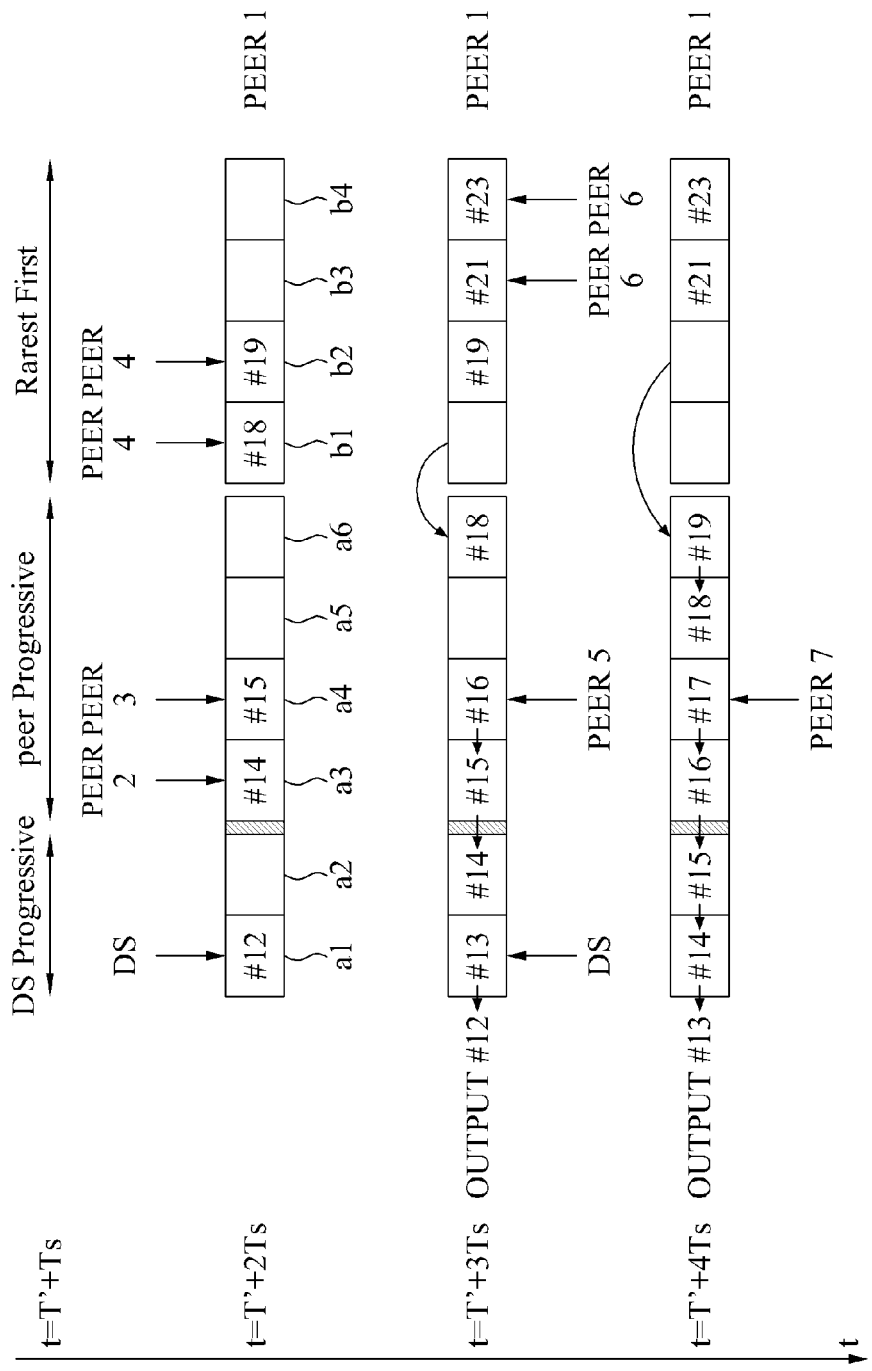
FIG. 15 is a diagram illustrating a buffer structure of a peer client according to an exemplary embodiment of the present invention.

FIG. 15 is a diagram illustrating a buffer structure of a peer client according to an exemplary embodiment of the present invention. As shown in FIG. 15, the buffer of peer 1 may be divided into three regions, a first region (size '2'), a second region (size '4'), and a third region (size '4'). The sizes of each region may be changed, and the buffer may be divided into two regions or four or more regions. As mentioned above with respect to FIG. 14A and FIG. 14B, the first region and the second region may receive assigned pieces using a determined receiving scheme from a determined source during a given time interval Ts. For example, as shown in FIG. 15, the first region may include a first buffer space a1 and a second buffer space a2, and the second region may include a third buffer space a3, a fourth buffer space a4, a fifth buffer space a5, a sixth buffer space a6. The first region and the second region may shift pieces to the left during a time interval Ts according to the queuing method described with respect to FIG. 14A. However, the third region may not shift pieces to the left (i.e., the third region may be used as a static buffer space that is, a non-queuing buffer space). For example, if pieces are received by the Rarest First scheme, received pieces may be stored vacant buffer spaces of the third region. Further, each piece stored in the third region may be transmitted to the last buffer space of the second region during the piece number of each piece stored in the third region is being assigned to the last buffer space of the second region. For example, as shown in FIG. 15, pieces 18 and 19 may be received using the Rarest First scheme during the time interval Ts (from "T'+Ts" to "T'+2Ts") and be stored in vacant buffer spaces b1 and b2, respectively. During a time interval Ts (from "T'+2Ts" to "T'+3Ts"), piece 18 may be assigned to the last buffer space of second region (i.e., the sixth region a6) and piece 18 may be retrieved from the buffer space b1 and be stored in the last buffer space of the second region. Likewise, piece 19 may be retrieved from the buffer space b2 and be stored in the last buffer space of the second region during a time interval Ts (from "T'+3Ts" to "T'+4Ts"). Thus, more rare pieces in the connected streaming channel may be requested and be stored in the third region regardless of the sequence of the index numbers. Peer 1 may receive corresponding pieces in parallel and store the received pieces to corresponding buffer spaces. For example, peer 1 may receive piece 12 from a delivery server DS and receive piece 14, piece 15, piece 18, and piece 19 from other peers 2, 3, and 4 during a time interval Ts (from "T'+Ts" to "T'+2Ts"). For example, the first region, the second region, and the third region may receive pieces using 'DS Progressive', 'peer Progressive', and 'peer Rarest First', respectively, but are not limited as such. Further, the piece receiving scheme used by the third region may have a higher priority than the piece receiving scheme used by the second region, and the piece receiving scheme used by the second region may have a higher priority than the piece receiving scheme used by the first region.

Figure 16:
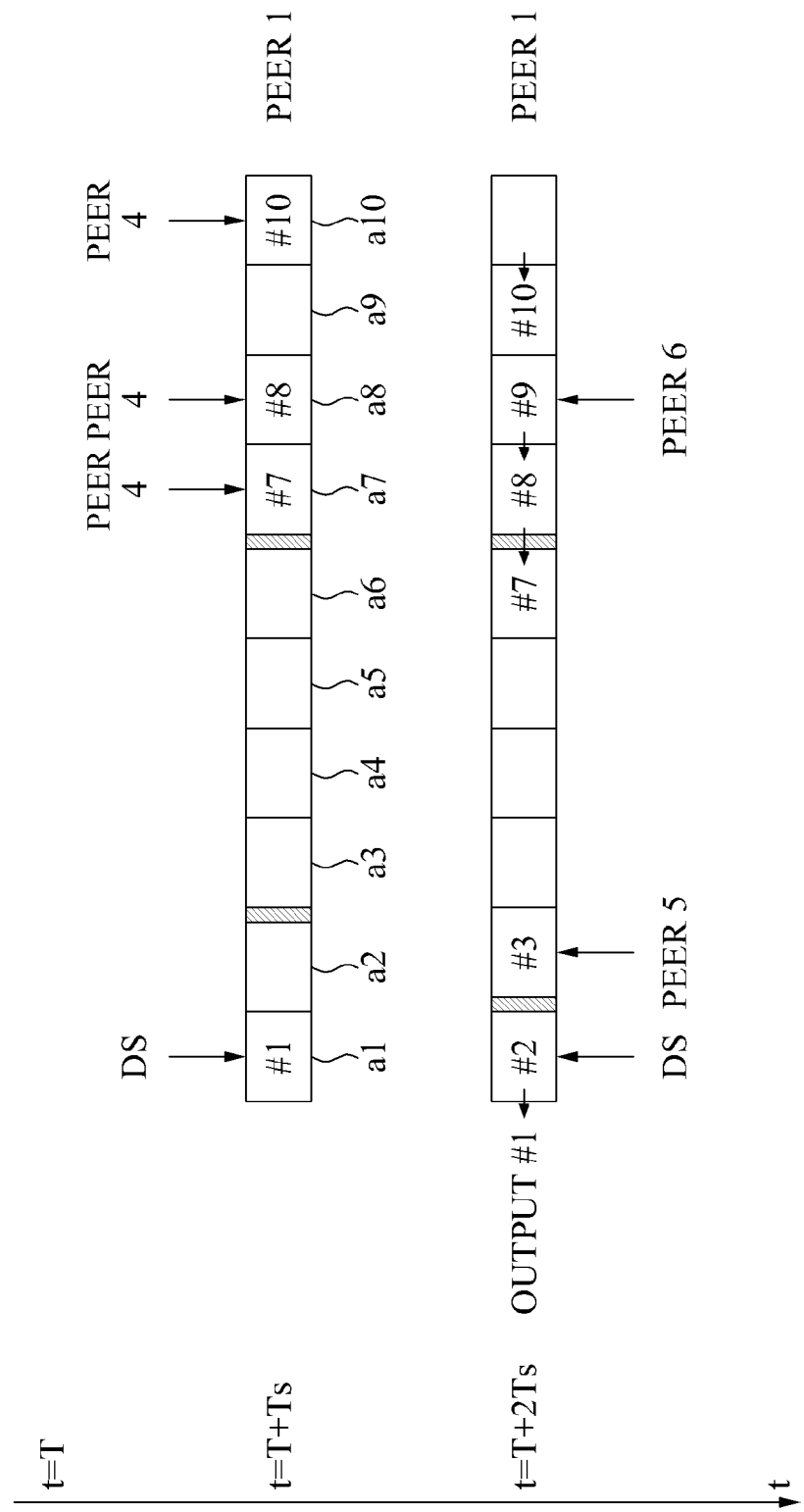
FIG. 16 is a diagram illustrating an adaptive buffer structure of a peer client according to an exemplary embodiment of the present invention.

FIG. 16 is a diagram illustrating an adaptive buffer structure of a peer client according to an exemplary embodiment of the present invention. As shown in FIG. 16, peer 1 may receive corresponding pieces in parallel and store the received pieces to corresponding buffer spaces. For example, peer 1 may receive piece 1 from a delivery server DS and receive piece 7, piece 8, and piece 10 from another peer 4 during a time interval Ts (from 'T' to 'T+Ts'). Further, peer 1 may shift pieces to the left during a time interval Ts (from 'T+Ts' to 'T+2Ts'). For example, peer 1 may output piece 1 from the first buffer space a1 and shift pieces 7, 8, and 10 to the left during the time interval Ts (from 'T+Ts' to 'T+2Ts'). Further, peer 1 may receive piece 2 from the delivery server DS, piece 3 from peer 5, and piece 9 from peer 6 in parallel during the time interval Ts (from 'T+Ts' to 'T+2Ts'). Peer 1 may receive pieces from a delivery server to store the received pieces in the first buffer space a1 and the second buffer space a2, if it is assumed that the first region, the second region, and the third region may receive pieces using 'DS Progressive', 'peer Progressive', and 'peer Rarest First', respectively. Although piece 3 is assigned in the second buffer space a2 of the first region during the time interval Ts (from 'T+Ts' to 'T+2Ts'), piece 3 may be received from other peers (i.e., peer 5) if other peers have piece 3 during the time interval Ts (from 'T+Ts' to 'T+2Ts'). Thus, sizes of the first region, the second region, and the third region may be adaptively controlled, based on piece sharing condition among delivery server and peers, to increase a piece sharing ratio and/or to decrease server usage of delivery servers.

Figure 17:
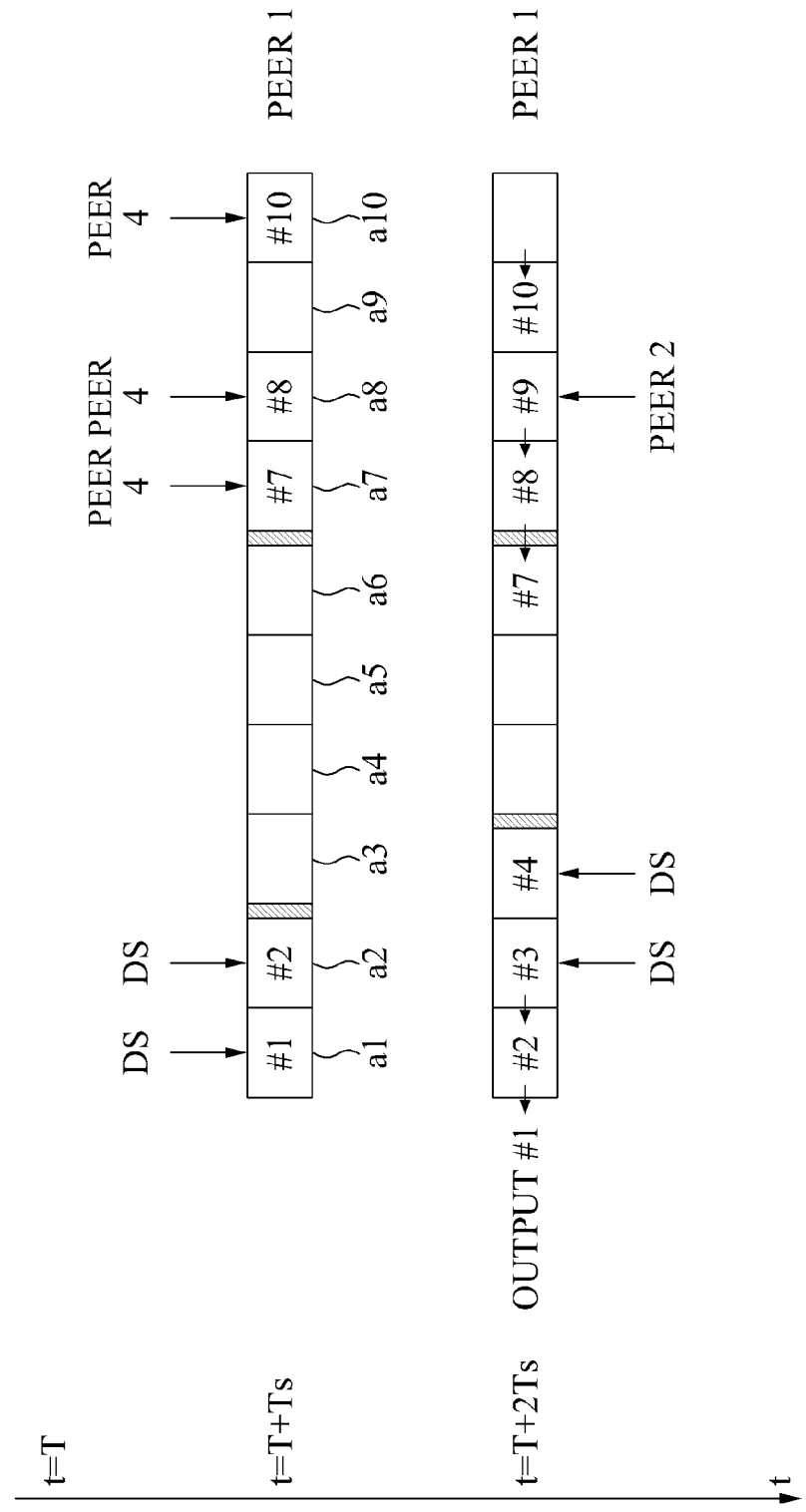
FIG. 17 is a diagram illustrating an adaptive buffer structure of a peer client according to an exemplary embodiment of the present invention.

FIG. 17 is a diagram illustrating an adaptive buffer structure of a peer client according to an exemplary embodiment of the present invention. As shown in FIG. 17, peer 1 may receive corresponding pieces in parallel and store the received pieces to corresponding buffer spaces. For example, peer 1 may receive piece 1 and piece 2 from a delivery server DS and receive piece 7, piece 8, and piece 10 from another peer 4 during a time interval Ts (from 'T' to 'T+Ts'). Further, peer 1 may shift pieces to the left during a time interval Ts (from 'T+Ts' to 'T+2Ts'). For example, peer 1 may output piece 1 from the first buffer space a1 and shift pieces 2, 7, 8, and 10 to the left during the time interval Ts (from 'T+Ts' to 'T+2Ts'). Further, peer 1 may receive piece 3 and piece 4 from the delivery server DS, and piece 9 from peer 2 in parallel during the time interval Ts (from 'T+Ts' to 'T+2Ts'). Peer 1 may receive pieces from a delivery server to store the received pieces in the first buffer space a1 and the second buffer space a2, if it is assumed that the first region, the second region, and the third region may receive pieces using 'DS Progressive', 'peer Progressive', and 'peer Rarest First', respectively. Although piece 4 is assigned in the third buffer space a3 of the second region during the time interval Ts (from 'T+Ts' to 'T+2Ts'), piece 4 may be received from the delivery server to increase streaming service quality or to increase the sharing ratio of piece 4. If piece 4 is rare among peers during the time interval Ts (from 'T+Ts' to 'T+2Ts'), it may cause streaming delays for some peers. Streaming delays may cause an asynchronization among peers and thus the sharing ratio may decrease. Furthermore, if piece 4 is transmitted from the delivery server to some peers, the sharing ratio of piece 4 may increase. Thus, sizes of the first region, the second region, and the third region may be adaptively controlled, based on a piece sharing condition among delivery server and peers, to increase a piece sharing ratio and/or to decrease server usage of delivery servers.

Figure 18:
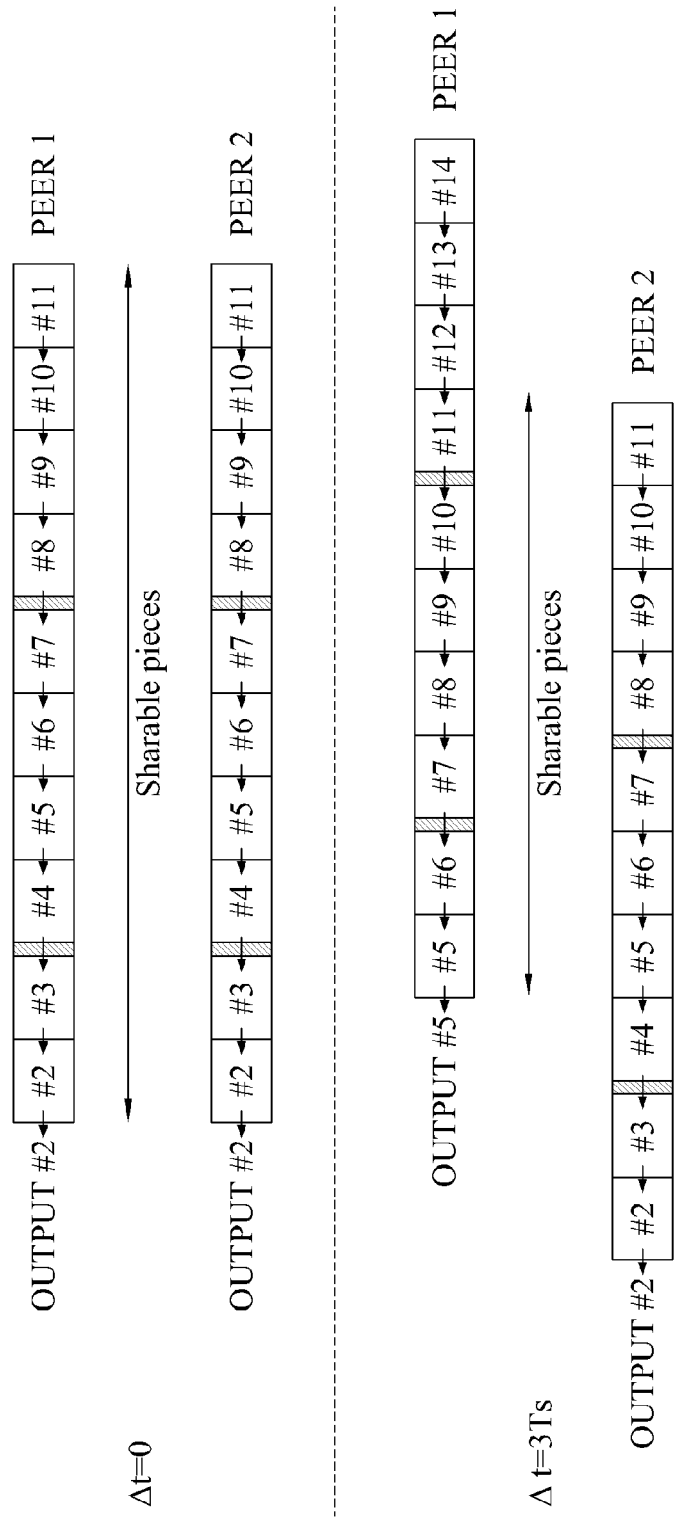
FIG. 18 is a diagram illustrating a streaming synchronization among peers according to an exemplary embodiment of the present invention.

FIG. 18 is a diagram illustrating a streaming synchronization among peers according to an exemplary embodiment of the present invention. As shown in the upper portion of FIG. 18, if streaming of pieces between peer 1 and peer 2 are more synchronized, sharable pieces between peer 1 and peer 2 increase. That is, if the difference (Δt) between index numbers of pieces outputted from peer 1 and peer 2 during the same time interval is smaller, sharable pieces between peer 1 and peer 2 increase (a higher sharing ratio). As shown in the lower portion of FIG. 18, if the difference (Δt) increases (i.e., Δt=3Ts), sharable pieces between peer 1 and peer 2 decrease (a lower sharing ratio).

According to exemplary embodiments, data stream synchronization among a server and one or more peers may be maintained even though encoder traffic is not stable. Further, a P2P-based streaming may be efficiently performed by maintaining a higher sharing ratio regardless of a varying bit rate, and a VBR may be supported by generating pieces of a received data stream based on a determined time interval, rather than generating predetermined-sized pieces. Further, an empty piece generated for an empty time interval may be used to maintain synchronization with a peer and prevent a decrease in a sharing ratio by generating the empty piece.

The methods according to exemplary embodiments of the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A system to packetize a data stream generated by an encoder, the system comprising:
a processor configured to,
generate data pieces of the data stream by determining sizes for each of the data pieces based on a variable bit rate of the encoder such that the data pieces have different sizes set such that each of the data pieces are generated at a first constant rate during an equal time interval regardless of a rate at which the data stream is received, and
generate, as at least one of the data pieces of the data stream, an empty piece corresponding to a time interval during which the data stream is not received; and
a transmitter configured to transmit the pieces of the data stream at a second constant rate such that a sharing ratio is one of maintained and increased, the sharing ratio being based on a server usage of a channel and a number of pieces transmitted over the channel, the server usage being based on an influx rate of peer clients and a number of concurrently connected ones of the peer clients.

2. The system of claim 1, wherein the transmitter is configured to transmit the pieces to one or more of the peer clients in response to a request for the pieces therefrom.

3. The system of claim 1, further comprising:
a delivery server configured to transmit the pieces to one or more of the peer clients; and
a controller configured to control server usage of the delivery server based on a variable associated with the influx rate of the peer clients and the number of concurrently connected ones of the peer clients that are concurrently connected to the delivery server.

4. The system of claim 3, wherein the variable is determined to be a relatively larger value in response to a determination that the influx rate is changed to a higher value and the variable is determined to be a relatively smaller value in response to a determination that the influx rate is changed to a lower value.

5. The system of claim 1, wherein the equal time interval is associated with a time interval for processing a buffer of one or more of the peer clients.

6. The system of claim 1, wherein the empty piece comprises index information and data stream size information.

7. The system of claim 6, wherein the data stream size information of the empty piece is zero.

8. A method that uses a processor to packetize a data stream generated by an encoder, the method comprising:
- generating, using the processor, data pieces of the data stream by determining sizes for each of the data pieces based on a variable bit rate of the encoder such that the data pieces have different sizes set such that each of the data pieces are generated at a first constant rate during an equal time interval;
- generating, using the processor, as at least one of the data pieces of the data stream, an empty piece corresponding to a time interval during which the data stream is not received; and
- transmitting the pieces of the data stream at a second constant rate such that a sharing ratio is one of maintained and increased, the sharing ratio being based on a server usage of a channel and a number of pieces transmitted over the channel, the server usage being based on an influx rate of peer clients and a number of concurrently connected ones of the peer clients.

9. The method of claim 8, wherein the data pieces are transmitted to one or more of the peer clients through a delivery server in response to a request for the data pieces therefrom.

10. The method of claim 9, further comprising:
- controlling server usage of the delivery server based on a variable associated with the influx rate of the peer clients and the number of concurrently connected ones of the peer clients that are concurrently connected to the delivery server.

11. The method of claim 10, wherein the variable is determined to be a relatively larger value in response to a determination that the influx rate is changed to a higher value and the variable is determined to be a relatively smaller value in response to a determination that the influx rate is changed to a lower value.

12. A non-transitory computer-readable medium comprising a program for instructing a computer, when executed by a processor, to perform the method of claim 8.

13. A system to packetize data pieces from a data stream generated by an encoder in a peer-to-peer based streaming service, comprising:
- a processor configured to,
  - packetize a first data piece in a first time interval, and
  - packetize a second data piece in a second time interval, the first time interval and the second time interval being an equal duration, the first data piece and the second data piece are packetized by determining sizes thereof based on a variable bit rate of the encoder such that the first data piece and the second data piece have different sizes set such that the first data piece and the second data piece are packetized at a first constant rate during the equal time interval regardless of a rate at which the data stream is received, and
  - generate, as at least one of the data pieces of the data stream, an empty piece corresponding to a time interval during which the data stream is not received; and
- a transmitter configured to transmit the first data piece and the second data piece to a peer client at a second constant rate such that a sharing ratio is one of maintained and increased, the sharing ratio being based on a server usage of a channel and a number of pieces transmitted over the channel, the server usage being based on an influx rate of peer clients and a number of concurrently connected ones of the peer clients.

14. A method for processing a data stream generated by an encoder by a first peer in a peer-to-peer based streaming service, comprising:
- receiving, by a processor, data pieces of the data stream from a packetizing server, the packetizing server generating the data pieces by determining sizes for each of the data pieces based on a variable bit rate of the encoder such that the data pieces have different sizes set such that each of the data pieces are generated at a first constant rate and transmitting the data pieces to the first peer at a second constant rate such that a sharing ratio is one of maintained and increased, the sharing ratio being based on a server usage of a channel and a number of data pieces transmitted over the channel, the server usage being based on an influx rate of peer clients and a number of concurrently connected peer clients;
- storing, by the processor, the data pieces in assigned locations of a buffer; and
- processing, by the processor, the stored pieces based on a processing time interval, wherein
  - the processing time interval is associated with a packetizing time interval in which the data pieces of the data stream are generated by the packetizing server, the packetizing time interval being the first constant rate for each of the data pieces such that the packetizing time interval is an equal time period for each of the data pieces generated regardless of a rate at which the data stream was received by the packetizing server, and
  - an empty piece is generated that corresponds to a time interval during which the data stream is not received.

15. The method of claim 14, wherein the processing time interval and the packetizing time interval have an equal duration.

16. The method of claim 14, further comprising:
- receiving a first piece of the data stream and a second piece of the data stream;
- storing the first piece in a first location of the buffer and the second piece in a second location of the buffer; and
- shifting the first piece and the second piece during the processing time interval, wherein
  - shifting the first piece and the second piece is repeated during a next processing time interval.

17. The method of claim 16, further comprising:
- outputting the first piece if the first piece is shifted from a first buffer space of the buffer.

18. The method of claim 14, wherein the processing time interval is equal to a processing time interval of another peer.

* * * * *